US012649205B2

(12) United States Patent
Takata et al.

(10) Patent No.: US 12,649,205 B2
(45) Date of Patent: Jun. 9, 2026

(54) FLANGE FITTING FOR TUBULAR STRUCTURES

(71) Applicant: Keystone Tower Systems, Inc., Denver, CO (US)

(72) Inventors: Rosalind K. Takata, Denver, CO (US); Loren Daniel Bridgers, Golden, CO (US); Eric D. Smith, Denver, CO (US); Eric Rubio, Denver, CO (US)

(73) Assignee: Keystone Tower Systems, Inc., Westminster, CO (US)

( * ) Notice: Subject to any disclaimer, the term of this patent is extended or adjusted under 35 U.S.C. 154(b) by 0 days.

(21) Appl. No.: 18/402,151

(22) Filed: Jan. 2, 2024

(65) Prior Publication Data

US 2025/0010411 A1 Jan. 9, 2025

Related U.S. Application Data

(63) Continuation of application No. 17/517,819, filed on Nov. 3, 2021, now Pat. No. 11,883,907, which is a
(Continued)

(51) Int. Cl.
B23K 37/00 (2025.01)
B23K 31/02 (2006.01)
(Continued)

(52) U.S. Cl.
CPC .............. B23K 37/04 (2013.01); B23K 31/02 (2013.01); B23K 37/003 (2013.01);
(Continued)

(58) Field of Classification Search
CPC ...... B23K 37/04; B23K 31/02; B23K 37/003; B23K 37/047; B23K 37/0536;
(Continued)

(56) References Cited

U.S. PATENT DOCUMENTS

| 3,324,275 | A | 6/1967 | Peignen |
| 3,329,329 | A | 7/1967 | Karmann |

(Continued)

FOREIGN PATENT DOCUMENTS

| CA | 1088284 A | 10/1980 |
| CA | 1300695 C | 5/1992 |

(Continued)

OTHER PUBLICATIONS

Machine translation of JP-59189092-A (no date available).*

(Continued)

*Primary Examiner* — Kiley S Stoner
(74) *Attorney, Agent, or Firm* — Schwegman Lundberg & Woessner, P.A.

(57) ABSTRACT

Devices, systems, and methods are directed to automated techniques for fitting flanges to tubular sections used to form tubular structures, such as large-scale structures used in industrial applications (e.g., wind towers and pipelines). As compared to manual techniques for fitting flanges to tubular sections, the devices, systems, and methods of the present disclosure facilitate faster attachment of flanges, which may be useful for achieving cost-effective throughput. By way of further comparison to manual techniques, the devices, systems, and methods of the present disclosure may, further or instead, facilitate achieving tighter dimensional tolerances. In turn, such tighter dimensional tolerances may be useful for forming thinner-walled, lighter, and lower cost tubular structures. Still further or in the alternative, automated techniques for fitting flanges to tubular sections may facilitate attachment of multipiece flanges or other non-traditional flange geometries.

20 Claims, 16 Drawing Sheets

Related U.S. Application Data continuation of application No. 16/509,390, filed on Jul. 11, 2019, now Pat. No. 11,185,952.

(60) Provisional application No. 62/696,717, filed on Jul. 11, 2018.

(51) Int. Cl.

| | |
|---|---|
| *B23K 37/003* | (2025.01) |
| *B23K 37/04* | (2006.01) |
| *B23K 37/047* | (2006.01) |
| *B23K 37/0536* | (2025.01) |
| *B23K 37/0538* | (2025.01) |
| *F16L 23/024* | (2006.01) |
| *F16L 23/12* | (2006.01) |
| *B23K 101/06* | (2006.01) |

(52) U.S. Cl.

CPC ........ *B23K 37/047* (2013.01); *B23K 37/0536* (2013.01); *B23K 37/0538* (2013.01); *F16L 23/024* (2013.01); *F16L 23/12* (2013.01); *B23K 2101/06* (2018.08)

(58) Field of Classification Search

CPC .... B23K 2101/06; B23K 37/053–0538; B23K 9/0956; B23K 9/167; B23K 9/18; B23K 9/32; B23K 26/21; B23K 26/702; F16L 23/024; F16L 23/12; G01B 5/252; B23P 19/00

USPC ...................................... 228/44.5, 49.1, 49.3

See application file for complete search history.

(56) References Cited

U.S. PATENT DOCUMENTS

| | | | |
|---|---|---|---|
| 3,925,854 | A | 12/1975 | McFadden |
| 3,963,231 | A | 6/1976 | Cooper |
| 4,039,115 | A | 8/1977 | Randolph et al. |
| 4,081,651 | A | 3/1978 | Randolph et al. |
| 5,444,206 | A | 8/1995 | Isshiki et al. |
| 6,016,948 | A | 1/2000 | Kurotobi et al. |
| 6,070,784 | A | 6/2000 | Hold et al. |
| 8,941,023 | B2 | 1/2015 | Holste et al. |
| 10,107,002 | B1 | 10/2018 | Newmeister |
| 11,185,952 | B2 | 11/2021 | Takata et al. |
| 11,883,907 | B2 | 1/2024 | Takata et al. |
| 2011/0109030 | A1 | 5/2011 | Flaig |
| 2014/0124483 | A1 | 5/2014 | Henn |
| 2016/0375476 | A1 | 12/2016 | Smith et al. |
| 2017/0276260 | A1* | 9/2017 | Bonel ..................... F16L 13/02 |
| 2020/0016700 | A1 | 1/2020 | Schahuber |
| 2020/0292102 | A1 | 9/2020 | Ducceschi et al. |

FOREIGN PATENT DOCUMENTS

| | | | | |
|---|---|---|---|---|
| CA | 2044625 | C | 10/1996 | |
| CA | 2714515 | A1 | 11/2010 | |
| CA | 2922980 | A1 | 3/2015 | |
| CA | 2980559 | A1 | 9/2016 | |
| CA | 3082399 | A1 | 5/2019 | |
| CN | 101678432 | B | 4/2013 | |
| CN | 104708220 | A * | 6/2015 | |
| CN | 104551496 | B | 8/2016 | |
| CN | 112805113 | A | 5/2021 | |
| CN | 115446567 | A | 12/2022 | |
| EP | 2561948 | A1 | 2/2013 | |
| EP | 3801976 | A1 | 4/2021 | |
| EP | 4088856 | A1 | 11/2022 | |
| GB | 2523769 | A | 9/2015 | |
| JP | 59189092 | A * | 10/1984 | ............ B23K 26/28 |
| JP | 60145288 | A | 7/1985 | |
| JP | 6155433 | A | 3/1986 | |
| JP | 61-152353 | A | 7/1986 | |
| JP | 4127985 | B2 | 4/1992 | |
| JP | H04-127988 | A | 2/1994 | |
| JP | H04127985 | A * | 2/1994 | |
| JP | H06193780 | A | 7/1994 | |
| JP | 2656656 | | 9/1997 | |
| JP | 11-10486 | A | 1/1999 | |
| JP | 11-277301 | A | 10/1999 | |
| JP | 3075723 | B1 | 8/2000 | |
| JP | 2001079662 | A | 3/2001 | |
| JP | 3199866 | U * | 9/2015 | ......... B23K 37/0276 |
| JP | 61-007095 | B2 | 4/2017 | |
| JP | 7421539 | B | 1/2024 | |
| KR | 960007162 | A | 3/1996 | |
| KR | 101610636 | B1 * | 4/2016 | |
| SU | 1272094 | A1 | 11/1986 | |
| WO | 2020014521 | A1 | 1/2020 | |

OTHER PUBLICATIONS

JP Patent and Trademark Office; JP Application No. 2024002926; Office Action of Mar. 18, 2025; 5 pages.

ESAB, "Fit Up System; FIT 30, 60 and 100," Oct. 12, 2011, (2 pages).

European Patent Office, "International Search Report and Written Opinion," issued in related International Patent Application No. PCT/US2019/41462, dated Nov. 12, 2019 (12 pages).

European Patent Office, "International Preliminary Report on Patentability," issued in related International Patent Application No. PCT/US2019/41462, dated Jan. 12, 2021 (7 pages).

Canadian Intellectual Property Office, "Examiner's Report," issued in related Canadian Patent Application No. 3,105,163, dated Mar. 2, 2023 (4 pages).

China National Intellectual Property Administration, "First Office Action," issued in related Chinese Patent Application No. 2019800463926, dated Feb. 28, 2022, including English translation (24 pages).

National Intellectual Property Administration, P.R. China, "Notification to Grant," issued in Chinese Patent Application No. 201980046392.6 dated Jul. 14, 2022, including English translation (2 pages).

China National Intellectual Property Administration, "First Office Action," issued in related Chinese Patent Application No. 2022111455132, dated May 11, 2023, including English translation (4 pages).

China National Intellectual Property Administration, "Office Action," issued in related Chinese Patent Application No. 2022111455132, dated Dec. 19, 2023 (8 pages).

European Patent Office, "Decision to Grant," issued in related International Patent Application No. PCT/US2019/041462, dated Aug. 11, 2022 (2 pages).

European Patent Office, "Extended European Search Report," issued in related European Patent Application No. 22182053.3, dated Oct. 13, 2022 (6 pages).

European Patent Office, "Decision to Grant," issued in related European Patent Application No. 22182053.3 dated Feb. 15, 2024 (2 pages).

Japan Patent Office, "Notification of Reasons for Rejection," issued in related Japanese Patent Application No. 2021-500253, dated Jan. 30, 2023, including English translation (11 pages).

Japan Patent Office, "Decision for Patent," issued in related Japanese Patent Application No. 2021-500253 dated Dec. 19, 2023, including English translation (2 pages).

U.S. Patent and Trademark Office, "Non-Final Office Action," issued in related U.S. Appl. No. 16/509,390 dated Apr. 22, 2021 (17 pages).

U.S. Patent and Trademark Office, "Notice of Allowance and Fee(s) Due," issued in related U.S. Appl. No. 16/509,390, dated Jul. 29, 2021 (9 pages).

U.S. Patent and Trademark Office, "Non-Final Office Action," issued in related U.S. Appl. No. 17/517,819 dated Oct. 28, 2022 (18 pages).

(56)                    References Cited

OTHER PUBLICATIONS

U.S. Patent and Trademark Office, "Notice of Allowance and Fee(s) Due," issued in related U.S. Appl. No. 17/517,819 dated Jun. 8, 2023 (18 pages).
U.S. Patent and Trademark Office, "Notice of Allowance and Fee(s) Due," issued in related U.S. Appl. No. 17/517,819, dated Oct. 4, 2023 (11 pages).
Japan Patent Office, "Notification of Reasons for Rejection," issued in related Japanese Patent Application No. 2021-500253, dated Aug. 22, 2023, including English translation (6 pages).
European Patent Office, "Intent to Grant," issue in related European Patent Application No. 19746274.0 dated Mar. 18, 2022 (65 pages).
Korean Intellectual Property Office, "Request for the Submission of an Opinion," issued in related Korean Patent Application No. 1020217004344, dated Apr. 17, 2024, including English Translation (12 pages).
Canadian Intellectual Property Office, "Examiner's Report," issued in related Canadian Patent Application No. 3,105,163, dated Jun. 13, 2024 (4 pages).
China National Intellectual Property Administration, "Notice to Grant," issued in related Chinese Patent Application No. 2022111455132, dated May 1, 2024, including English translation (4 pages).
Mexican Institue of the Industrial Property, "First Office Action," issued in related Mexican Patent Application No. MX/a/2021/000341 dated Jun. 4, 2024, including English translation (6 pages).
European Patent Office, "Extended Search Report," issued in related European Patent Application No. 25162779 dated Aug. 13, 2024 (6 pages).

\* cited by examiner

402

205

204

408

START

ROTATE A TUBULAR SECTION TOWARD A JOINING UNIT
610

ROTATE AT LEAST A PORTION OF A FLANGE TOWARD THE JOINING UNIT
612

RECEIVE ONE OR MORE SIGNALS INDICATIVE OF A RADIAL OFFSET
614

ADJUST AN AXIAL GAP
615

RADIAL OFFSET WITHIN TARGET VALUE?
616

ADJUST THE RADIAL OFFSET
618

NO

YES

JOIN THE AT LEAST ONE PORTION OF THE FLANGE TO THE TUBULAR SECTION
620

END

600

FLANGE FITTING FOR TUBULAR STRUCTURES

CROSS-REFERENCE TO RELATED APPLICATIONS

This application is a continuation of U.S. patent application Ser. No. 17/517,819, filed Nov. 3, 2021, which is a continuation of U.S. patent application Ser. No. 16/509,390, filed Jul. 11, 2019, which claims the benefit of U.S. Provisional Patent Application No. 62/696,717, filed on Jul. 11, 2018, with the entire contents of each of these applications hereby incorporated herein by reference.

GOVERNMENT LICENSE RIGHTS

This invention was made with government support under USDA SBIR Phase II Award 2016-33610-25675, awarded by the United States Department of Agriculture/National Institute of Food and Agriculture. The United States government has certain rights in this invention.

BACKGROUND

Many large-scale tubular structures useful for various industrial applications are formed by connecting tubular sections to one another or to a foundation using one or more flanged connections. Each flanged connection is typically formed by attaching a flange to a respective tubular section. The process of attaching a flange to a tubular section, however, is often difficult and lengthy, particularly in instances requiring non-standard geometries such as multipiece flanges. Thus, attaching a flange to a tubular section can be a rate-limiting step in the production of a tubular structure, requiring extra equipment and labor to achieve suitable production throughput.

Applications requiring high-precision fit-up can be particularly challenging with respect to attaching a flange to a tubular section used in the formation of a tubular structure. In particular, while high-precision fit-up can increase the fatigue strength of a structure-flange joint and may facilitate using less material in a tubular structure (thus reducing cost), the cost associated with added time required to achieve high precision fit-up often outweighs the structural savings realized through high-precision fit-up.

Accordingly, there remains a need for efficiently fitting flanges to tubular sections used to form tubular structures for various large-scale applications.

SUMMARY

Devices, systems, and methods are directed to automated techniques for fitting flanges to tubular sections used to form tubular structures, such as large-scale structures used in industrial applications (e.g., wind towers and pipelines). As compared to manual techniques for fitting flanges to tubular sections, the devices, systems, and methods of the present disclosure facilitate faster attachment of flanges, which may be useful for achieving cost-effective throughput. By way of further comparison to manual techniques, the devices, systems, and methods of the present disclosure may, further or instead, facilitate achieving tighter dimensional tolerances. In turn, such tighter dimensional tolerances may be useful for forming thinner-walled, lighter, and lower cost tubular structures. Still further or in the alternative, automated techniques for fitting flanges to tubular sections may facilitate attachment of multipiece flanges or other non-traditional flange geometries.

According to one aspect, a system may include a plurality of tube rollers upon which a tubular section is supportable as the tubular section rotates in a rotation direction, a fitting unit including a locating roller and a pusher roller spaced relative to one another to define therebetween a pinch through which a flange is rotatable in the rotation direction, a sensing unit including one or more sensors positioned relative to the pinch to detect a radial offset of the flange and the tubular section moving in the rotation direction, and a controller in communication with the sensing unit and the fitting unit, the controller configured to receive one or more signals indicative of the radial offset, to compare the one or more signals indicative of the radial offset to a target value, and, based at least in part on the comparison, to move the locating roller to adjust the radial offset between the flange and the tubular section moving in the rotation direction.

In certain implementations, the plurality of the tube rollers may include a first set of the tube rollers and a second set of the tube rollers. The first set of the tube rollers and the second set of the tube rollers may be apart from one another along a circumference of the tubular section as the tubular section moves along a path of movement in the rotation direction. Further, or instead, the first set of the tube rollers and the second set of the tube rollers may be actuatable to move relative to one another. Still further, or instead, the first set of the tube rollers and the second set of the tube rollers may be actuatable to move relative to one another as the tubular section moves in the rotation direction. In some instances, the one or more sensors may be positioned to detect the radial offset of the flange and the tubular section between the first set of the tube rollers and the second set of the tube rollers along the path of movement of the tubular section in the rotation direction.

In some implementations, the pinch defined by the locating roller and the pusher roller may be between at least two of the tube rollers of the plurality of the tube rollers along a path of movement of the tubular section in the rotation direction.

In certain implementations, at least one of the tube rollers of the plurality of the tube rollers may be passive.

In some implementations, the fitting unit may include a first actuator mechanically coupled to the locating roller and the pusher roller defining the pinch. Further, or instead, the controller may be configured to actuate the first actuator to move the pinch to adjust the radial offset between the flange and the tubular section moving in the rotation direction.

In certain implementations, the locating roller may define a channel engageable with the flange to restrict axial movement of the flange as the flange rotates through the pinch in the rotation direction.

In some implementations, the fitting unit may include a second actuator mechanically coupled to the locating roller. Further, or instead, the second actuator may be actuatable to change an axial gap between the flange and the tubular section moving in the rotation direction. Additionally, or alternatively, at least one of the locating roller and the pusher roller may be passive with respect to movement of the flange in the rotation direction.

In certain implementations, the system may include a joining unit positioned relative to the pinch to join a point of the flange to the tubular section following movement of the point of the flange through the pinch in the rotation direction. In some instances, the one or more sensors may be positioned relative to the joining unit to measure the radial offset at the point of the flange following movement of the point of the flange past the joining unit. Further or instead, the sensing unit may be fixed relative to the joining unit such that the one or more sensors measure the radial offset at a fixed location relative to the joining unit. Additionally, or alternatively, the sensor may further include a cooler including a fluid inlet, a fluid outlet, and a cooling chamber in fluid communication with the fluid inlet and the fluid outlet, the sensing unit defining a volume in which at least a portion of each of the one or more sensors is disposed, and the volume in thermal communication with the cooling chamber of the cooler. Further, or instead, the joining unit may include a weld head.

In some implementations, each of the one or more sensors may be positionable in contact with one or more of the flange or the tubular section moving in the rotation direction.

In certain implementations, the locating roller may be movable in an axial direction relative to the tubular section engaged by the plurality of tube rollers. Additionally, or alternatively, the system may include a gap sensor arranged to measure an axial gap between the flange and the tubular section moving in the rotation direction. As an example, the controller may be configured to receive a signal indicative of the axial gap between the flange and the tubular section moving in the rotation direction, to compare the axial gap to a target gap, and, based on the comparison of the axial gap to the target gap, to move the locating roller in the axial direction relative to the tubular section engaged by the plurality of tube rollers. The signal indicative of the axial gap between the flange and the tubular section may, for example, include a user input.

In some implementations, the one or more signals indicative of the radial offset may include a user input.

According to another aspect, a method of fitting a flange to a tubular section may include rotating the tubular section, supported on a plurality of tube rollers, in a direction toward a joining unit, rotating at least one portion of the flange in the direction toward the joining unit, receiving one or more signals indicative of a radial offset between the tubular section and the at least one portion of the flange, comparing the one or more signals indicative of the radial offset to a target value, and based at least in part on the comparison of the one or more signals to the target value, adjusting the radial offset between the at least one portion of the flange and the tubular section as the tubular section and the at least one portion of the flange each rotate in the direction toward the joining unit.

In certain implementations, rotation of the tubular section and the at least one portion of the flange in the direction toward the joining unit may be about an axis perpendicular to a direction of gravity.

In some implementations, in a radial direction, the at least one portion of the flange may be more rigid than the tubular section.

In certain implementations, each tube roller in the plurality of the tube rollers may be spaced apart from one another circumferentially along an outer surface of the tubular section. Further or instead, rotating the tubular section includes driving at least one roller in contact with the outer surface of the tubular section.

In some implementations, rotating the at least one portion of the flange in the direction toward the joining unit may include engaging first surface of the at least one portion of the flange with a pusher roller, and engaging a second surface of the at least one portion of the flange with a locating roller such that the at least one portion of the flange is pinched between the locating roller and the pusher roller.

In certain implementations, the one or more signals indicative of the radial offset may be received from one or more sensors as the tubular section and the at least one portion of the flange move in the direction toward the joining unit.

In some implementations, the one or more signals indicative of the radial offset include one or more of the following: a radius of curvature of the tubular section between two of the tube rollers of the plurality of the tube rollers; a stress level in the tubular section; a distance between two points along a circumference of the tubular section; a radial distance between a location on the tubular section and a corresponding circumferential location on the flange; or a distance between a point on the tubular section and a fixed point external to the tubular section. Additionally, or alternatively, the one or more signals indicative of the radial offset include one or more of the following: torque required to actuate at least one of tube roller of the plurality of the tube rollers; rotational speed of at least one of the tube rollers of the plurality of the tube rollers; or a position of at least one of the tube rollers of the plurality of the tube rollers.

In certain implementations, the one or more signals indicative of the radial offset may include a user input.

In some implementations, the at least one portion of the flange may be a unitary hoop. Further, or instead, the target value of the radial offset may be based on a first circumference of the unitary hoop relative to a second circumference of the tubular section.

In certain implementations, the target value may vary as the at least one portion of the flange and the tubular section rotate in the direction toward the joining unit. Further, or instead, adjusting the radial offset may include receiving an indication of circumferential spacing between a first tick mark on the tubular section and a second tick mark on the at least one portion of the flange, and adjusting the target value for the radial offset based on the indication of circumferential spacing of the first tick mark relative to the second tick mark.

In some implementations, adjusting the radial offset may include moving at least one of the tube rollers of the plurality of the tube rollers in a direction having a radial component relative to the tubular section as the tubular section and the at least one portion of the flange rotate in the direction toward the joining unit. As an example, adjusting the radial offset may include pushing the at least one portion of the flange in a direction having a radial component relative to the at least one portion of the flange as the at least one of the tube rollers of the plurality of the tube rollers moves in the direction having a radial component relative to the tubular section.

In certain implementations, adjusting the radial offset may include pushing the at least one portion of the flange in a direction having a radial component relative to the at least one portion of the flange as the plurality of the tube rollers remain in a fixed radial position and in a fixed axial position as the at least one portion of the flange and the tubular section each rotate in the direction toward the joining unit. Additionally, or alternatively, the method may include adjusting one or more of the fixed radial position or the fixed axial position of at least one tube roller of the plurality of the tube rollers as the tubular section is stationary.

In some implementations, the method may further or instead include adjusting an axial gap between the tubular section and the at least one portion of the flange. For example, adjusting the axial gap between the tubular section and the at least one portion of the flange may include moving the at least one portion of the flange in an axial direction as the tubular section remains fixed in the axial direction.

In certain implementations, the method may further or instead include joining the at least one portion of the flange to the tubular section as the tubular section and the at least one portion of the flange rotate in the direction toward the joining unit.

BRIEF DESCRIPTION OF THE FIGURES

Like reference symbols in the various drawings indicate like elements.

DETAILED DESCRIPTION

Figure 1:
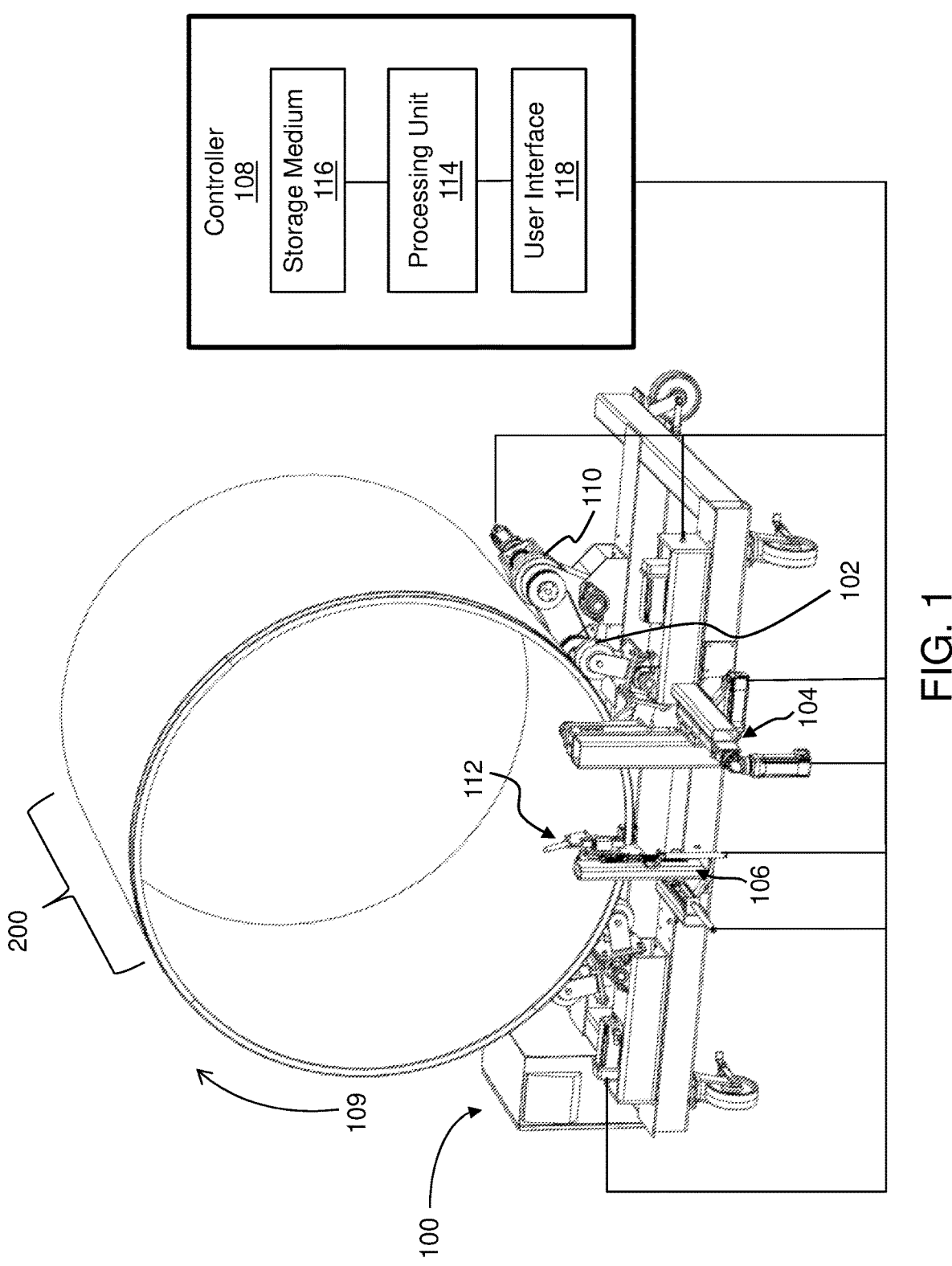
FIG. 1 is a perspective view of a fit-up system including a plurality of tube rollers, sensing unit, a fitting unit, a joining unit, and a controller, the fit-up system shown forming a tubular assembly.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the disclosure that follows, the terms "horizontal" and "vertical" refer to directions in a coordinate system defined by an installed system supported on a substantially flat surface (e.g., on a factory floor or at an installation site). That is, a horizontal orientation shall be understood to be substantially parallel to the substantially flat surface supporting the installed system. A vertical orientation shall be understood to be perpendicular to the horizontal orientation and generally parallel to a direction of gravity.

In general, as used herein, a "tubular section" may be a hollow and substantially cylindrical (e.g., having a substantially constant diameter to within a dimensional tolerance of the tubular structure or having a tapering diameter along a length of the cylinder) such that each tubular section defines a cylindrical coordinate system. Thus, as used herein, the terms "axial" and "radial" shall be understood to be used in a manner consistent with use of those terms with respect to a cylindrical coordinate system. For example, axial shall be understood to refer to a direction parallel to a center axis defined by the tubular section and extending along the length of the tubular section, and the term radial shall be understood to refer to a radial dimension in a direction perpendicular to the center axis defined by the tubular section. Accordingly, as described in greater detail below, an axial gap refers herein to a space between an edge of a tubular section and an edge of a flange in the axial direction, with an axial gap of zero corresponding to an abutting relationship between the edge of the tubular section and the edge of the flange. As also described in greater detail below, a radial offset shall refer to a shift in radial position of the flange and the center axis of the tubular section relative to one another, with a zero radial offset corresponding to alignment of the inner diameter of the flange to the inner diameter of the tubular section. Further, in the context of the tubular section and the flange, a rotation direction shall be understood to be a direction of rotation (e.g., clockwise or counterclockwise) of the circumference of the tubular section about the center axis defined by the tubular section.

As used herein, unless otherwise specified or made clear from the context, the term "flange" refers generally to any of various different types of structures (e.g., a rim or a collar) positionable along at least a portion of a circumference of the tubular section. In general, such a flange may facilitate connecting the tubular section with a foundation or another tubular section and/or to strengthen the tubular section. As an example, a flange may include a radial section projecting radially inward and/or radially outward with respect to an outer surface of the tubular section, and this radial projection of the flange may be useful for connecting to a foundation or another tubular section without compromising strength of the tubular section. In certain implementations, as described in greater detail below, the flange may be formed using a plurality of sections that are coupled to one another as each section is coupled to the tubular section. The plurality of sections may collectively circumscribe the circumference of the tube section. In other implementations, as also described in greater detail below, the flange may be a unitary hoop having nominally (e.g., to within dimensional tolerance of the tubular structure being formed) the same diameter as the diameter of the tubular section.

As used herein, the term "tubular assembly" shall be understood to refer to an assembly including at least a section of a flange mechanically coupled to a tubular section. Each tubular assembly should be generally understood to be at least a portion of a larger tubular structure. Thus, in some instances, the tubular assembly may correspond to an entire tubular structure. In other instances, the tubular assembly may be a portion of a larger tubular structure. For example, at least one end of the tubular assembly may include a flange to facilitate connecting the tubular assembly to a foundation and/or to one or more other tubular assemblies of a tubular structure.

Further, unless otherwise specified or made clear from the context, the tubular assemblies described herein may be used to form at least a portion of any one or more different types of tubular structures useful for supporting loads in a variety of industrial applications. Examples of such tubular structures may include, but are not limited to, towers for supporting mechanical equipment (e.g., wind turbines) or pipes for transporting material.

Referring now to FIGS. 1, 2A, 2B, and 2C, a fit-up system 100 may be operated to form a tube assembly 200 including a tubular section 202 and a flange 204. The flange 204 may be generally "L" shaped, having a radial section 205 extending radially inward such that the flange 204 may be connectable to a foundation or another tubular assembly along an inner volume of a tubular structure. Such an orientation of the flange 204 may be useful, for example, in the context of towers used to support wind turbine machinery, with the radially inward extent of the flange 204 serving to support auxiliary equipment (e.g., ladders, cables, etc.) that may be accessed within an inner volume of a tubular structure during inclement weather. Further, or instead, the inward extension of the radial section 205 may facilitate inspecting bolt connections of the tubular structure without needing to climb the outside of the tubular structure.

Although the tubular section 202 may have a generally round circumferential shape at any point in the axial direction, the tubular section 202 may sag in the radial direction due to gravitational effects. This type of sagging may be particularly pronounced, for example, in instances in which the tubular section 202 has a large inner diameter relative to a wall thickness of the tubular section 202. In such instances, the tubular section 202 may have a poor overall shape match with the flange 204, which may be stiffer than the tubular section 202. That is, at the same nominal inner diameter, the flange 204 may generally maintain a rounder shape as compared to the tubular section 202. Such differences in shape between the tubular section 202 and the flange 204 present challenges with respect to adequately aligning the tubular section 202 and the flange 204 along a circumference of the tubular section 202 to form the tube assembly 200 according to predetermined dimensional tolerances (e.g., tolerances associated with large-scale industrial applications).

Figure 2A:
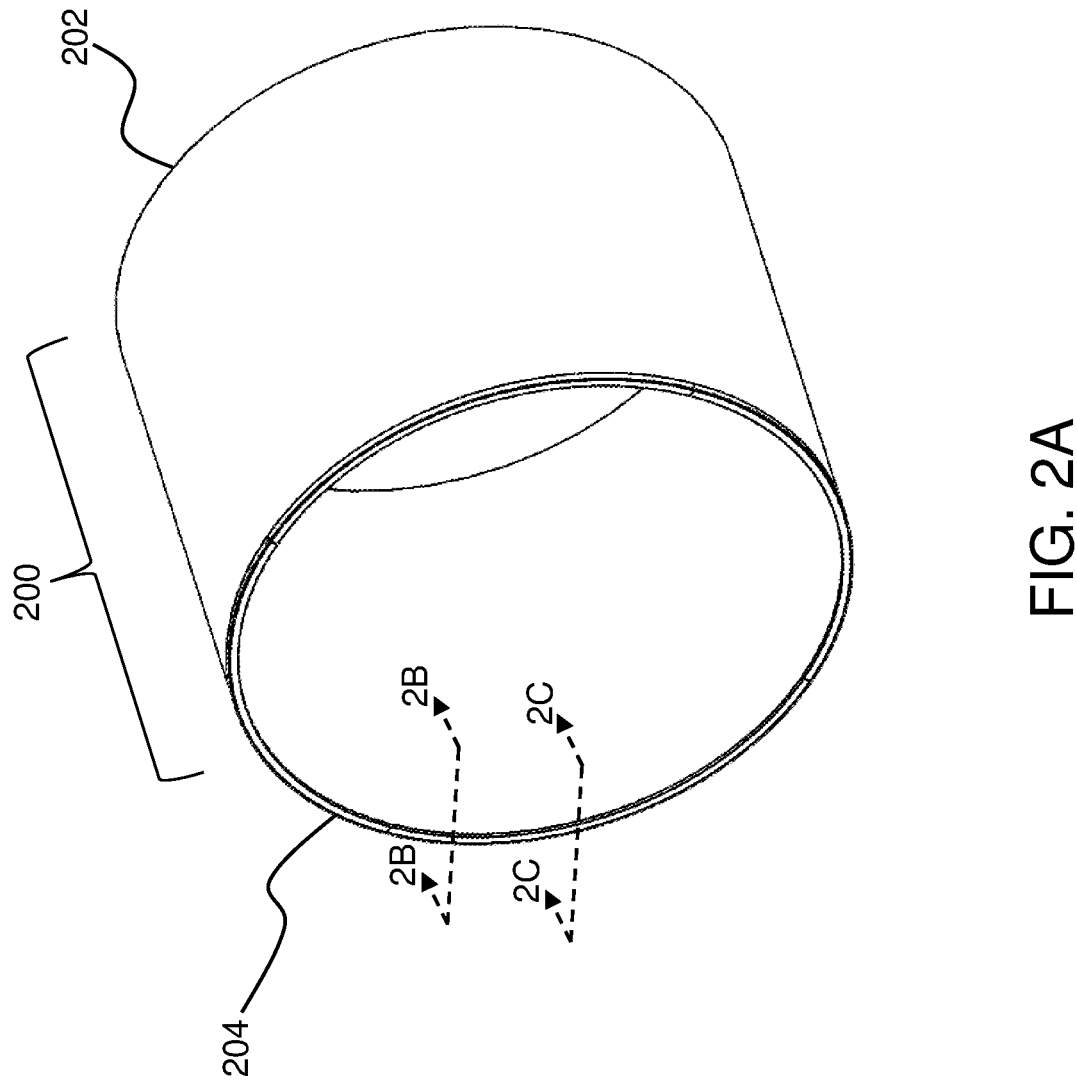
FIG. 2A is a schematic representation of the tubular assembly of FIG. 1, the tubular assembly including a flange mechanically coupled to a tubular section.
Figure 2B:
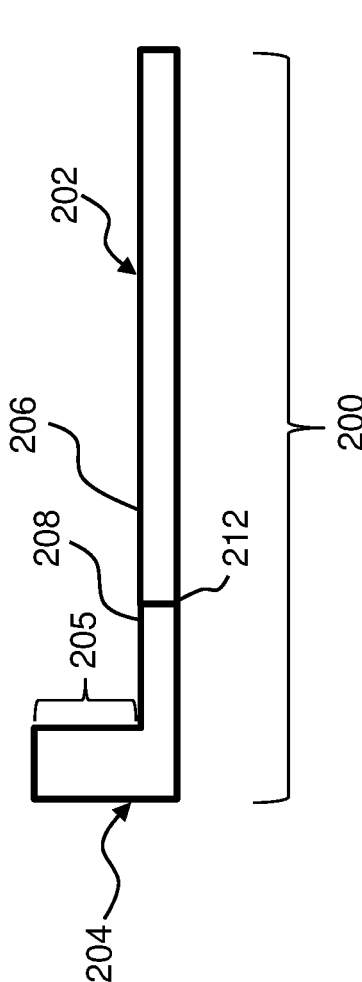
FIG. 2B is a cross-sectional side view along line 2B-2B in FIG. 2A, the cross-sectional side view representing a portion of the flange mated in radial alignment to the tubular section in the tubular assembly.
Figure 2C:
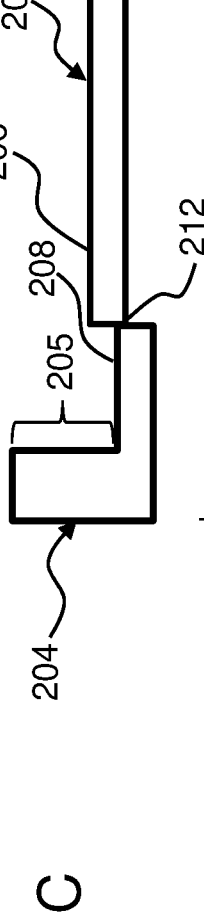
FIG. 2C is a cross-sectional side view along line 2C-2C in FIG. 2A, the cross-sectional side view representing a portion of the flange mated with a radial offset to the tubular section in the tubular assembly.
Figure 3A:
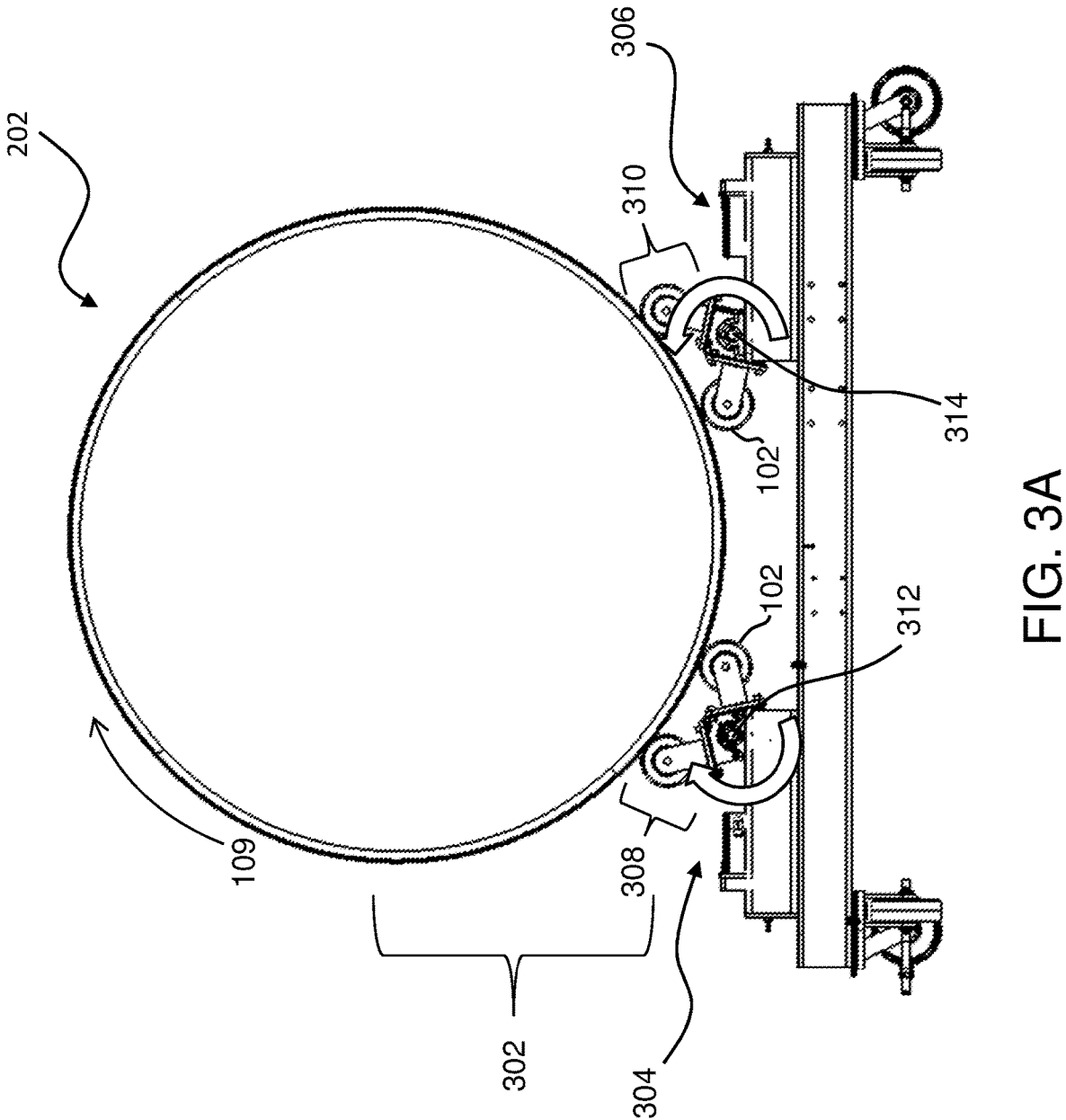
FIG. 3A is a side view of the tubular section of FIG. 2A supported on the plurality of tube rollers of the fit-up system of FIG. 1.
Figure 3B:
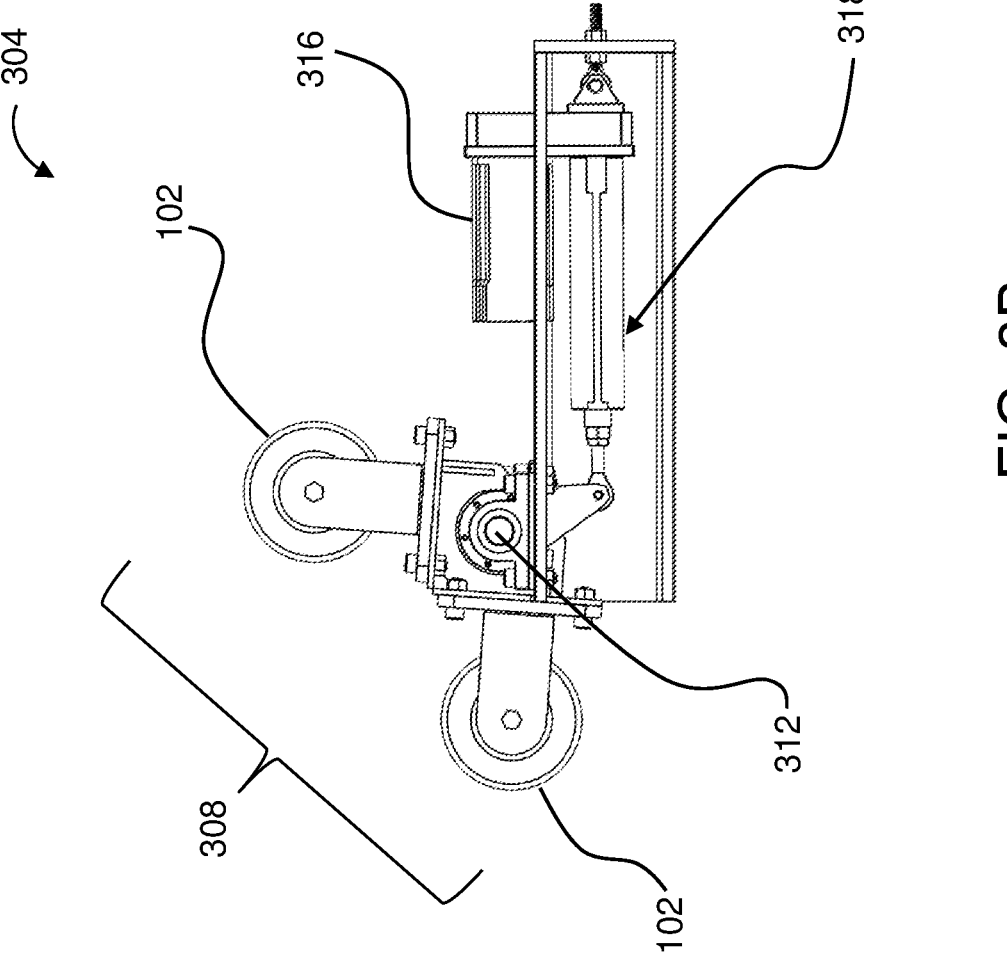
FIG. 3B is a side view of a roller assembly including a pair of the tube rollers of the plurality of the tube rollers of the fit-up system of FIG. 1.
Figure 4A:
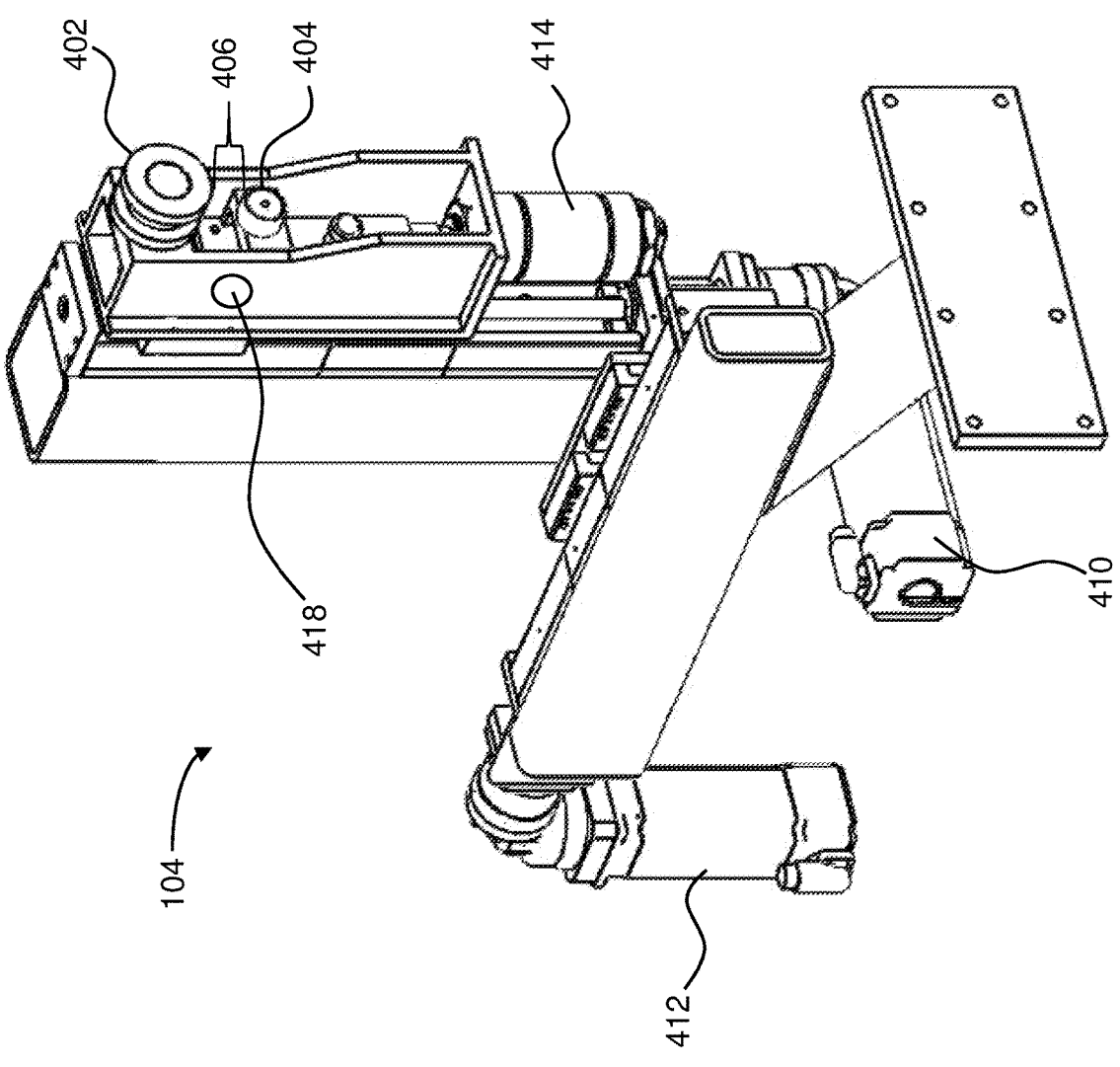
FIG. 4A is a perspective view of the fitting unit of the fit-up system of FIG. 1.
Figure 4B:
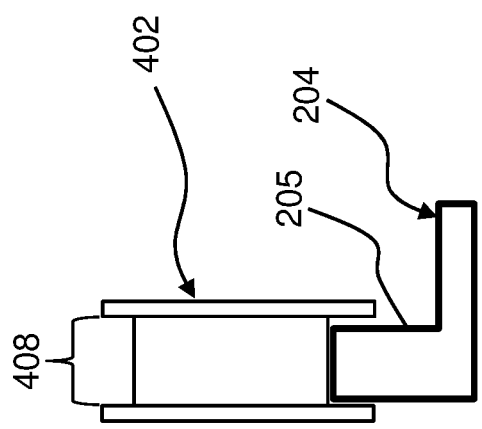
FIG. 4B is a schematic side view of a locating roller of the fitting unit of FIG. 4A engaged with a radial section of the flange of FIG. 2A.

To facilitate addressing the aforementioned challenges associated with aligning shapes of the tubular section 202 and the flange 204 to form the tube assembly 200, the fit-up system 100 may include a plurality of tube rollers 102, a fitting unit 104, a sensing unit 106, and a controller 108. The tube rollers 102 may support the tubular section 202 and rotate the tubular section 202 in a rotation direction 109. Further, or instead, the controller 108 may be in electrical communication with at least the fitting unit 104 and the sensing unit 106 to control alignment of a first inner surface 206 of the tubular section 202 and a second inner surface 208 of the flange 204, with a difference in radial alignment of the first inner surface 206 and the second inner surface 208 referred to here as a radial offset 210. In general, it should be appreciated that the radial offset 210 may be controlled along various different points (e.g., at discrete points or continuously) along the circumference of the tubular section 202. Additionally, or alternatively, the radial offset 210 at different points along the circumference of the tubular section 202 may have any of various different values suitable for achieving overall alignment of the tubular section 202 and the flange 204. For the sake of illustration, however, two examples are shown: an example in which the radial offset 210 is zero (also referred to herein as radial alignment) such that the first inner surface 206 of the tubular section 202 and the second inner surface 208 of the flange 204 are aligned as shown in FIG. 2B; and an example in which the radial offset 210 is nonzero such that the first inner surface 206 of the tubular section 202 and the second inner surface 208 of the flange 204 are offset as shown in FIG. 2C.

In use, as described in greater detail below, the tubular section 202 and the flange 204 may rotate together in a rotation direction 109 to move through the fitting unit 104 and the sensing unit 106 as the tube rollers 102 support and rotate the tubular section 202. For example, the flange 204 may be supported (e.g., hung from an overhead crane or a similar support) and initially secured (e.g., tack welded) to the tubular section 202 such that the flange 204 and the tubular section 202 rotate together in the rotation direction 109. As also described in greater detail below, the controller 108 may receive an indication of a radial offset 210 detected by the sensing unit 106 and, based on a comparison of the radial offset 210 to a target value, the controller may actuate the fitting unit 104 to adjust the radial offset 210 between the tubular section 202 and the flange 204. Significantly, it should be appreciated that the adjustment of the radial offset 206 as the tubular section 202 and the flange 204 rotate in the rotation direction 109, as described herein, may reduce time, alignment error, labor costs, or a combination thereof as compared to manual attachment processes.

Referring now to FIGS. 1, 2A, 2B, 2C, 3A, and 3B, the tubular section 202 may be supported by the tube rollers 102. For example, the tube rollers 102 may be positioned along a lower portion 302 of the tubular section 202 such that the force of gravity acting on the tubular section 202 maintains contact between the tubular section 202 and the tube rollers 102. As used herein, the lower portion 302 of the tubular section 202 shall be understood to be a portion of the tubular section 202 generally below a maximum horizontal dimension of the tubular section 202 supported on the tube rollers 102. For the sake of clarity, as the tubular section 202 rotates in the rotation direction 109, the lower portion 302 shall be understood to be the portion of the tubular section 202 generally below the maximum horizontal dimension of the tubular section 202 at a corresponding point in time. That is, the lower portion 302 of the tubular section 202 shall be understood to be defined with respect to a fixed coordinate system, even as the tubular section 202 rotates in the rotation direction 109.

With the lower portion 302 of the tubular section 202 in contact with the tube rollers 102, at least one instance of the tube rollers 102 may be actuatable to rotate the tubular section 202 in the rotation direction 109. In certain implementations, while at least one of the tube rollers 102 is actuatable to rotate the tubular section in the rotation direction 109, one or more other instances of the tube rollers 102 may be passive. In this context, a passive instance of the tube rollers 102 may be in contact with the tubular section 202 to exert a radial force on the tubular section 202 as the one or more actuated instances of the tube rollers 102 exert a radial force on the tubular section 202 while also exerting a rotational force to move the tubular section 202 in the rotation direction 109.

The force of gravity acting on the tubular section 202 supported by the tube rollers 102 may cause the tubular section 202 to sag between instances the tube rollers 102. In turn, such sagging of the tubular section 202 may contribute to a poor shape mismatch between the tubular section 202 and the flange 204 (FIGS. 2A-2C). Thus, to reduce a shape mismatch that may occur between the tubular section 202 and the flange 204, spacing of instances of the tube rollers 102 may be controllable, as described in greater detail below, through actuation prior to rotating the tubular section 202 or as the tubular section 202 is rotating in the rotation direction 109. As compared to conventional techniques in which passive rollers self-align under the weight of a tubular section, controlling the spacing of instances of the tube rollers 102 according to the techniques described herein may change the distribution of the weight of the tubular section 202 to bring the lower portion 302 of the tubular section 202 into a shape more closely approximating a form with constant radius. Further, or instead, control over the spacing of instances of the tube rollers 102 may bring the lower portion 302 of the tubular section 202 into a less round shape (e.g., into a shape that more closely approximates a flat line), which may be useful for alignment with certain designs of the flange 204.

In general, the term "spacing," in the context of the plurality of the tube rollers 102, shall be understood to include any of various different types of orientations in positioning of at least one instance of the tube rollers 102 relative to another instance of the tube rollers 102 and, therefore, relative to the tubular section 202. For example, as described in greater detail below, a change in spacing may include a change in angle of a pair of the tube rollers 102 in contact with the tubular section 202. Additionally, or alternatively, as also described in greater detail below, a change in spacing may include a change in distance between at least two instances of the tube rollers 102 in contact with the tubular section 202. More generally, unless otherwise specified or made clear from the context, a change in spacing of at least one instance of the tube rollers 102 relative to another instance of the tube rollers 102 shall be understood to be a controlled change in position of the tube rollers 102 to produce a corresponding change in shape of the lower portion 302 of the tubular section 202.

In certain implementations, the fit-up system 100 may include a first roller assembly 304 and a second roller assembly 306. The first roller assembly 304 may include a first set 308 of the tube rollers 102, and the second roller assembly 306 may include a second set 310 of the tube rollers 102. The first set 308 of the tube rollers 102 and the second set 310 of the tube rollers 102 may be apart from one another along a circumference of the tubular section 202 as the tubular section 202 moves along a path of movement in the rotation direction 109. In general, unless otherwise specified the first set 308 of the tube rollers 102 may include one or more instances of the tube rollers 102, and the second set 310 of the tube rollers 102 may include one or more instances of the tube rollers 102.

The shape of the portion of the tubular section 202 between the first set 308 and the second set 310 of the tube rollers 102 is a function of, among other things, the flexibility of the tubular section 202 in the radial direction and the orientation of the first set 308 and the second set 310 of the tube rollers 102 relative to one another and relative to a surface of the tubular section 202. Thus, given that the flexibility of the tubular section 202 in the radial direction is typically dictated by the end use of the tube assembly 200 being formed, it should be appreciated that adjusting the orientation of the first set 308 and the second set 310 of the tube rollers 102 relative to one another and/or relative to the surface of the tubular section 202 may be particularly useful for matching the shape of at least a portion of the tubular section 202 to the flange 204 to achieve control over the radial offset 210 at a given point along the circumference of the tubular section 202. In general, actuation of the first set 308 of the tube rollers 102 and the second set 310 of the tube rollers 102 may increase the efficiency of the fitting unit 104 and the sensing unit 106 by decreasing differences in shape between the tubular section 202 and the flange 204. That is, as the tubular section 202 and the flange 204 are more closely matched, the degree of actuation of the fitting unit 104 (described in greater detail below) needed to bring the tubular section 202 and the flange 204 to a desired fit-up may be reduced.

To facilitate controlling a poor shape match between the flange 204 and a portion of the tubular section 202 supported between the first set 308 and the second set 310 of the tube rollers 102, the first set 308 of the tube rollers 102 and the second set 310 of the tube rollers 102 may be movable relative to one another in one or more directions. For example, the first set 308 of the tube rollers 102 and the second set 310 of the tube rollers 102 may be positionable (e.g., slidable) in a horizontal direction relative to one another to increase or decrease a horizontal distance between the first set 308 and the second set 310 of the tube rollers 102. Additionally, or alternatively, the first set 308 of the tube rollers 102 may include two or more instances of the tube rollers 102 such that the first set 308 of the tube rollers 102 is pivotable about a first pivot 312. Further, or instead, the second set 310 of the tube rollers 102 may include two or more instance of the tube rollers 102 such that the second set 310 of the tube rollers 102 is pivotable about a second pivot 314. Through such pivoting, the respective angles of the first set 308 and/or the second set 310 of the tube rollers 102 may change to produce a corresponding change in shape of the portion of the tubular section 202 between the first set 308 and the second set 310 of the tube rollers 102. In such implementations including a first set 308 and a second set 310 of the tube rollers 102, each of the first set 308 and the second set 310 of the tube rollers 102 may be independently pivotable relative to the other one of the first set 308 and the second set 310 of the tube rollers 102. In some implementations, however, the pivoting of the first set 308 and the second set 310 of the tube rollers 102 may be linked to one another (e.g., to form mirror symmetric angles with respect to a vertical plane between the first set 308 and the second set 310 of the tube rollers 102).

In certain implementations, the first roller assembly 304 may include an actuator 316 and an electric cylinder 318 to adjust one or more of a linear position or an angle of the first set 308 of the tube rollers 102 of the first roller assembly 304. In particular, returning to the example of the first set 308 of the tube rollers 102 as being pivotable about the first pivot 312, the electric cylinder 318 may be mechanically coupled to the actuator 316 and to the first pivot 312. More specifically, the electric cylinder 318 may be offset from an axis of rotation of the first pivot 312. Through actuation of the actuator 316, the length of the electric cylinder 318 may change. Continuing with this example, as a result of the offset of the electric cylinder 318 relative to the first pivot 312, the change in length of the electric cylinder 318 may rotate the first set 308 of tube rollers 102 about the first pivot 312.

In general, the actuator 316 may be, for example, in electrical communication with the controller 108 such that the controller 108 may control the position of the first set 308 of the tube rollers 102 through one or more electrical actuation signals delivered to the actuator 316. In general, the first roller assembly 304 and the second roller assembly 306 are identical to one another (allowing for mirror symmetry of components) such that the first set 308 and the second set 310 of tube rollers 102 are actuatable to move relative to one another. Thus, for the sake of efficient description, the second roller assembly 306 is not described separately and should be understood to operate in a manner analogous to the operation of the first roller assembly 304.

In some implementations, the first set 308 and the second set 310 of tube rollers 102 may be actuated only at an initial setup of the fit-up system. For example, the first set 308 and the second set 310 of tube rollers 102 may be actuated at the beginning of a process to bring the lower portion 302 of the tubular section 202 to a desired shape (e.g., substantially round). Continuing with this example, following the initial setup, the tube rollers 102 may be held in the same position for the duration of the process of fitting and joining the flange 204 to the tubular section 202 to form the tube assembly 200. Because the first set 308 and the second set 310 of tube rollers 102 are actuated only for a limited period of time, it should be appreciated that such implementations may be useful for achieving efficient use of energy and/or preserving useful life of components, each of which may be particularly advantageous for in-field installations.

While the first set 308 and the second set 310 of tube rollers 102 may be actuated only at an initial setup in some implementations, other implementations may include actuating the first set 308 and the second set 310 of tube rollers 102 continuously (or at least periodically) during the process of fitting and joining the flange 204 to the tubular section 202 to form the tube assembly 200. For example, as described in greater detail below, one or more parameters of the shape of the tube assembly 200 may be provided (e.g., as a signal from the sensing unit 106, as a manual input, or a combination thereof) to the controller 108 as part of a feedback control in which the controller 108 sends an actuation signal to actuate the actuator 316 of one or both of the first roller assembly 304 or the second roller assembly 306 as the tubular section 202 moves in the rotation direction 109. The actuation of the first roller assembly 304, the second roller assembly 306, or a combination thereof may move the tube rollers 102 according to any one or more of the techniques described herein to achieve a target shape of the tubular section 202 and, in turn, form the tube assembly 200 according to the one or more shape parameters provided to the controller 108.

In general, the first set 308 and the second set 310 of tube rollers 102 may be any combination of driven or passive as may be suitable for a particular implementation. In some instances, therefore, at least one of the tube rollers 102 in each of the first set 308 and the second set 310 of the tube rollers 102 may be driven such that corresponding rotation of the respective instance of the tube roller 102 acts on the tubular section 202 to move the tubular section 202 in the rotation direction 109. Additionally, or alternatively, at least one of the tube rollers 102 in the first set 308 and the second set 310 of the tube rollers 102 may be passive such that rotation of the tubular section 202 in the rotation direction 109 imparts rotation to the respective instance of the tube roller 102. Thus, in some cases, each of the tube rollers 102 in the first set 308 and the second set 310 of the tube rollers 102 may be driven. In other cases, each of the first set 308 and the second set 310 of the tube rollers 102 may include a driven instance of the tube roller 102 and a passive instance of the tube roller 102. Additionally, or alternatively, each of the tube rollers 102 in the first set 308 and the second set 310 of the tube rollers 102 may be passive. That is, continuing with this example, the fit-up system may include an end roller 110 generally toward an end portion of the tubular section 202 opposite the flange 204, and the end roller 110 may be driven while each of the tube rollers 102 is passive. Such a combination of driving the end roller 110 as each of the tube rollers 102 are passive may be useful, for example, for decoupling driving the tubular section 202 and positioning the first set 308 and the second set 310 of the tube rollers 102. In turn, this decoupling may be useful for achieving more robust control over the relative positioning of the flange 204 relative to the tubular section 202.

Referring now to FIGS. 1, 2A, 2B, 2C, 3A, 3B, 4A, and 4B, the fitting unit 104 may include a locating roller 402 and a pusher roller 404 spaced relative to one another to define therebetween a pinch 406. The flange 204 may rotate through the pinch 406 in the rotation direction 109 as the pinch 406 controls an axial and radial position of the flange 204 relative to the tubular section 202 as the tubular section 202 also rotates in the rotation direction 109. The pinch 406 may be, for example, between at least two instance of the tube rollers 102 along a path of movement of the tubular section 202 in the rotation direction 109. As a more specific example, the pinch 406 may be generally between the first set 308 of the tube rollers 102 and the second set 310 of the tube rollers 102 along the path of movement of the tubular section 202 in the rotation direction 109. That is, a portion of the flange 204 may move through the pinch 306 as a corresponding portion of the tubular section 202 is supported between the first set 308 and the second set 310 of the tube rollers 102. Such positioning of the pinch 406 with respect to the first set 308 and the second set 310 of the tube rollers 102 may facilitate using the fitting unit 104 and the tube rollers 102 in coordination with one another to achieve a target value of the radial offset 210.

In general, the flange 204 moving through the pinch 406 in the rotation direction 109 is mechanically coupled to the tubular section 202 (e.g., through tack welding). Accordingly, the flange 204 and the tubular section 202 rotate in the rotation direction 109 at the same angular velocity and, more specifically, without relative rotational movement between the flange 204 and the tubular section 202. That is, rotation of the tubular section 202 by the tube rollers 102 also rotates the flange 204. Thus, in certain implementations, at least one of the locating roller 402 or the pusher roller 404 of the fitting unit 104 may be passive with respect to movement of the flange 204 in the rotation direction 109 through the pinch 406.

In certain implementations, the locating roller 402 may define a channel 408 engageable with the radial section 205 of the flange 204. With the radial section 205 of the flange 204 disposed in the channel 408, the locating roller 402 may restrict axial movement of the flange 204 while permitting rotation of the flange 204 in the rotation direction 109. In general, the channel 408 may have an axial dimension that is slightly larger than an axial dimension of the radial section 205 of the flange 204 such that the locating roller 402 may restrict axial movement of the flange 204 with a reduced likelihood of damaging the flange 204 and/or interfering with rotational movement of the flange 204 and the tubular section 202 mechanically coupled to the flange 204.

While the radial offset 210 between the tubular section 202 and the flange 204 has been described as being controllable through spacing of the tube rollers 102 to achieve a desired shape of the tubular section 202 (under the force of gravity) between at least two instances of the tube rollers 102, it should be appreciated that the position of the locating roller 402 may additionally or alternatively be adjustable to control the radial offset 210 between the tubular section 202 and the flange 204. For example, the fitting unit 104 may include a first actuator 410 mechanically coupled to the locating roller 402 and the pusher roller 404. Continuing with this example, actuation of the first actuator 410 may move the pinch 406 in a direction having a radial component (e.g., vertically in FIG. 4) such that a portion of the flange 204 between the pinch 406 also undergoes corresponding movement to adjust the radial offset 210 as the flange 204 and the tubular section 202 rotate in the rotation direction 109. In certain instances, the first actuator 410 may be in electrical communication with the controller 108, and the controller 108 is configured to send one or more signals to actuate the first actuator 410 to move the locating roller 402 and the pusher roller 404 defining the pinch 406. The one or more signals from the controller 108 to actuate the first actuator 410 may be based on a user input to the controller. Additionally, or alternatively, as described in greater detail below, the one or more signals from the controller 108 to actuate the first actuator 410 may be based on feedback from the sensing unit 106.

In some implementations, the fitting unit 104 may include a second actuator 412 mechanically coupled to the locating roller 402 and the pusher roller 404 defining the pinch 406. The second actuator 412 may be oriented relative to the first actuator 410 such that movement actuated by the second actuator 412 is, for example, substantially perpendicular to movement actuated by the first actuator 410. Thus, continuing with this example, in instances in which the first actuator 410 is actuatable to move the pinch 406 to adjust the radial offset 210, the second actuator 412 may be actuatable to move the pinch 406 in the axial direction. As a more specific example, the second actuator 412 may be actuated only initially as part of an initial set-up to set an axial spacing of the flange 204 relative to the tubular section 202 while the first actuator 410 may be actuated continuously or at least periodically to provide active control of the pinch 406 and, therefore, the radial offset 210 as the flange 204 rotates through the pinch 406 in the rotation direction 109.

While the second actuator 412 may be actuated only initially in certain implementations, it should be appreciated the second actuator 412 may be actuated according to one or more other actuation approaches. For example, the second actuator 412 may be actuated continuously throughout operation of the fit-up system 10. That is, in some instances, the tubular section 202 may move in the axial direction (sometimes referred to as "walking") relative to the tube rollers 102. Such walking movement may occur, for example, when the tube rollers 102 are misaligned with respect to one another. Additionally, or alternatively, walking movement may be particularly likely to occur when the tubular section 202 has a tapered shape such that the tube rollers 102 rest unevenly on the tapered shape. In instances in which the tubular section 202 may be prone to walking movement, continuously or substantially continuously actuating the second actuator 412 may be useful for moving the flange 204 in the axial direction to move with the tubular section 202. Further, or instead, continuous or substantially continuous actuation of the second actuator 412 may be useful for adjusting for irregularities in an edge of one or more of the tubular section 202 or the flange 204.

In some implementations, the fitting unit 104 may include a third actuator 414 mechanically coupled to the pusher roller 404 and actuatable to move the pusher roller 404 relative to the locating roller 402. That is, actuation of the third actuator 414 may change a dimension of the pinch 406. For example, to facilitate initially mounting the flange 204 in the pinch 406, the third actuator 414 may be actuated to move the pusher roller 404 in a direction away from the locating roller 402, thus increasing the size of the pinch 406. With the flange 204 positioned in the pinch 406, the third actuator 414 may be actuated to move the pusher roller 404 in a direction toward the locating roller 402, thus decreasing the size of the pinch 406 to a size suitable for restricting radial and axial movement of the flange 204 as the flange 204 moves through the pinch 406 in the rotation direction 109. Continuing still further with this example, upon completion of the tube assembly 200, the third actuator 414 may again be actuated to move the pusher roller 404 in the direction away from the locating roller 402 to increase the size of the pinch 406 and, therefore, facilitate removal of the tube assembly 200 from the fit-up system 100.

In general, the first actuator 410, the second actuator 412, and the third actuator 414 may be any one or more of various different electrical, hydraulic, pneumatic, and/or mechanical actuators useful for controlling linear movement of respective components of the fitting unit 104. For example, to facilitate integration with the controller 108, one or more of the first actuator 410, the second actuator 412, and the third actuator 414 may be an electric linear actuator. Such an electric linear actuator, coupled with control by the controller 108, may facilitate precise position control, continuous or at least periodic position control as the flange 204 and the tubular section 202 rotate in the rotation direction 109. Further or instead, the first actuator 410, the second actuator 412, and the third actuator 414 may be manually adjustable (e.g., through the use of a rack and pinion mechanism). Such manual adjustment may be useful, for example, for coarse position adjustments as part of initial set-up of the fit-up system 100.

Referring now to FIGS. 1, 2A, 2B, 2C, 3A, 3B, 4A, 4B, 5A, 5B, and 5C, the sensing unit 106 may include at least one instance of a sensor 502 positioned relative to the pinch 406 of the fitting unit 104 to detect the radial offset 210 of the flange 204 and the tubular section 202 moving in the rotation direction 109. For example, the sensor 502 may be positioned to detect the radial offset 210 corresponding to a point on the flange 204 after the respective point has passed through the pinch 406 of the fitting unit 104. Such positioning of the sensor 502 may be useful for, among other things, facilitating measurement of the radial offset 210 as a feedback parameter useful for controlling at least a radial position of the pinch 406 to achieve a target value of the radial offset 210 as the tubular section 202 and the flange 204 rotate in the rotation direction 109. As a more specific example, the sensor 502 may be positioned to detect the radial offset 210 at a point between the first set 308 of the tube rollers 102 and the second set 310 of the tube rollers 102 along the path of movement of the tubular section 202 in the rotation direction 109.

In certain implementations, the sensor 502 may be positionable in contact with one or more of the flange 204 or the tubular section 202 moving in the rotation direction 109. For example, the sensor 502 may include a first rod 504 and a second rod 506 aligned along an axis and spaced axially apart from one another across a seam 212 at which the flange 204 and the tubular section 202 are in an abutting relationship (e.g., through joining as described below) to one another. The first rod 504 may be biased (e.g., spring-biased) in contact with the flange 204 as the flange 204 rotates in the rotation direction 109, and the second rod 506 may be biased (e.g., spring-biased) in contact with the tubular section 202 as the tubular section 202 rotates in the rotation direction 109.

Figure 5A:
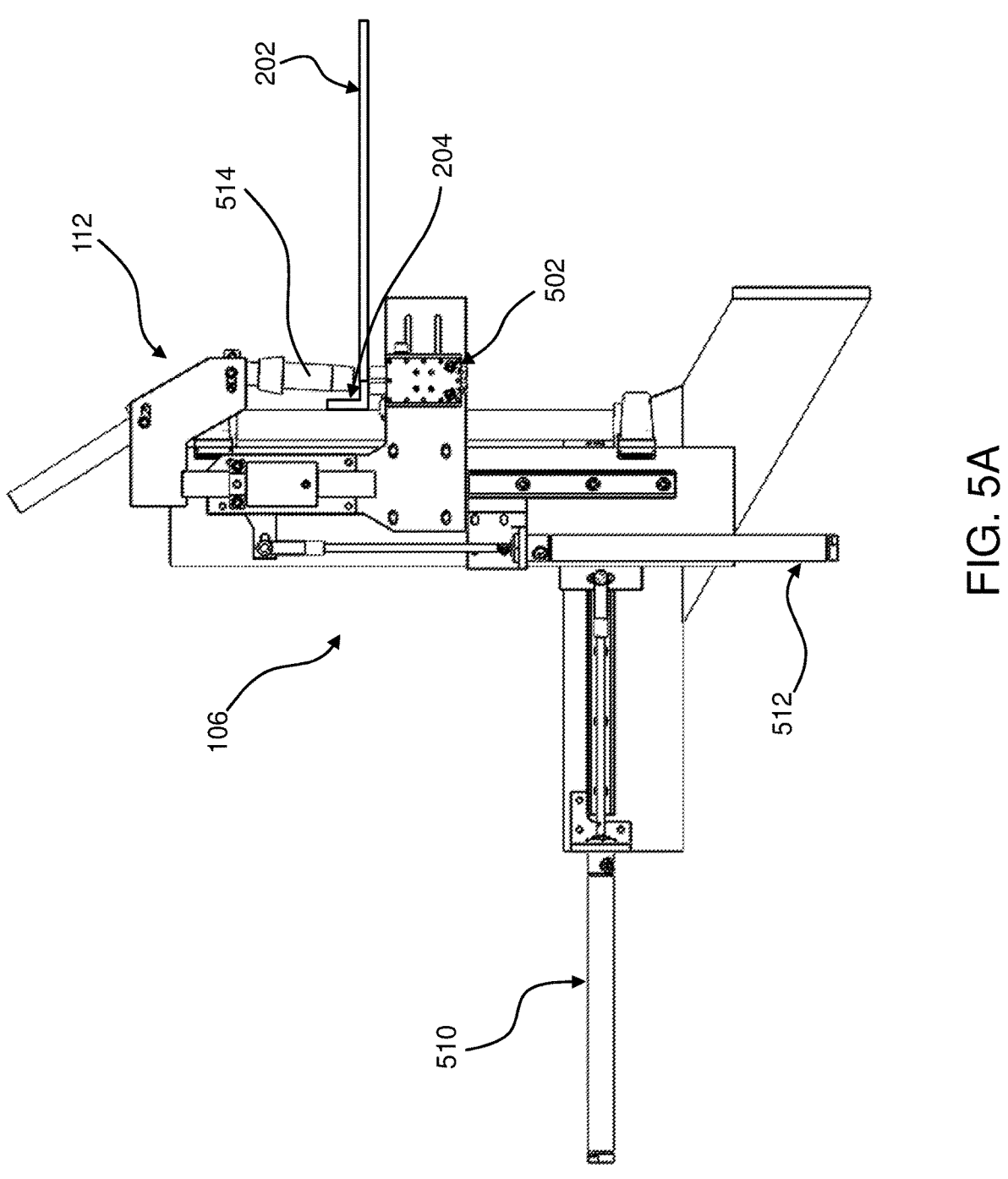
FIG. 5A is a side view of the sensing unit and the joining unit of the fit-up system of FIG. 1.
Figure 5B:
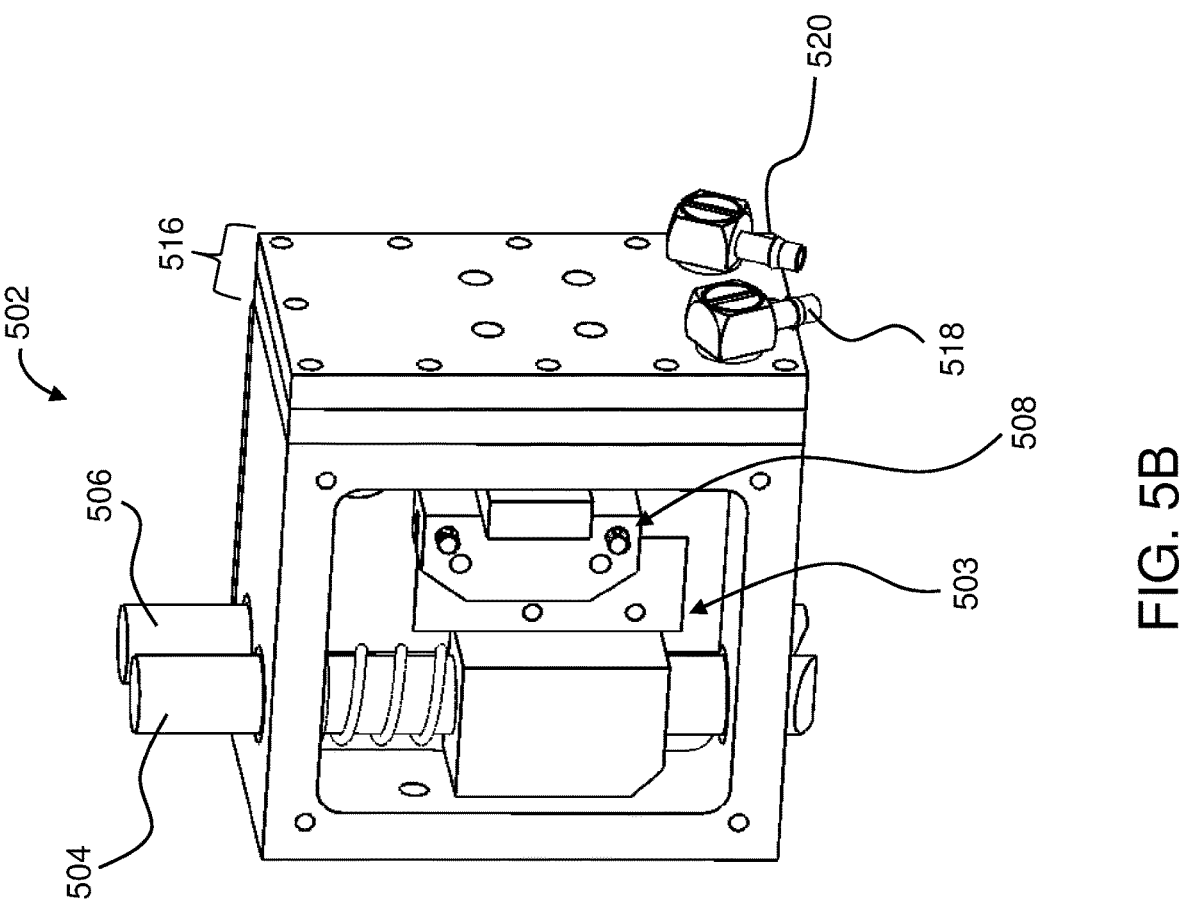
FIG. 5B is a partial cross-sectional view of a sensor of the sensing unit of the fit-up system of FIG. 1.
Figure 5C:
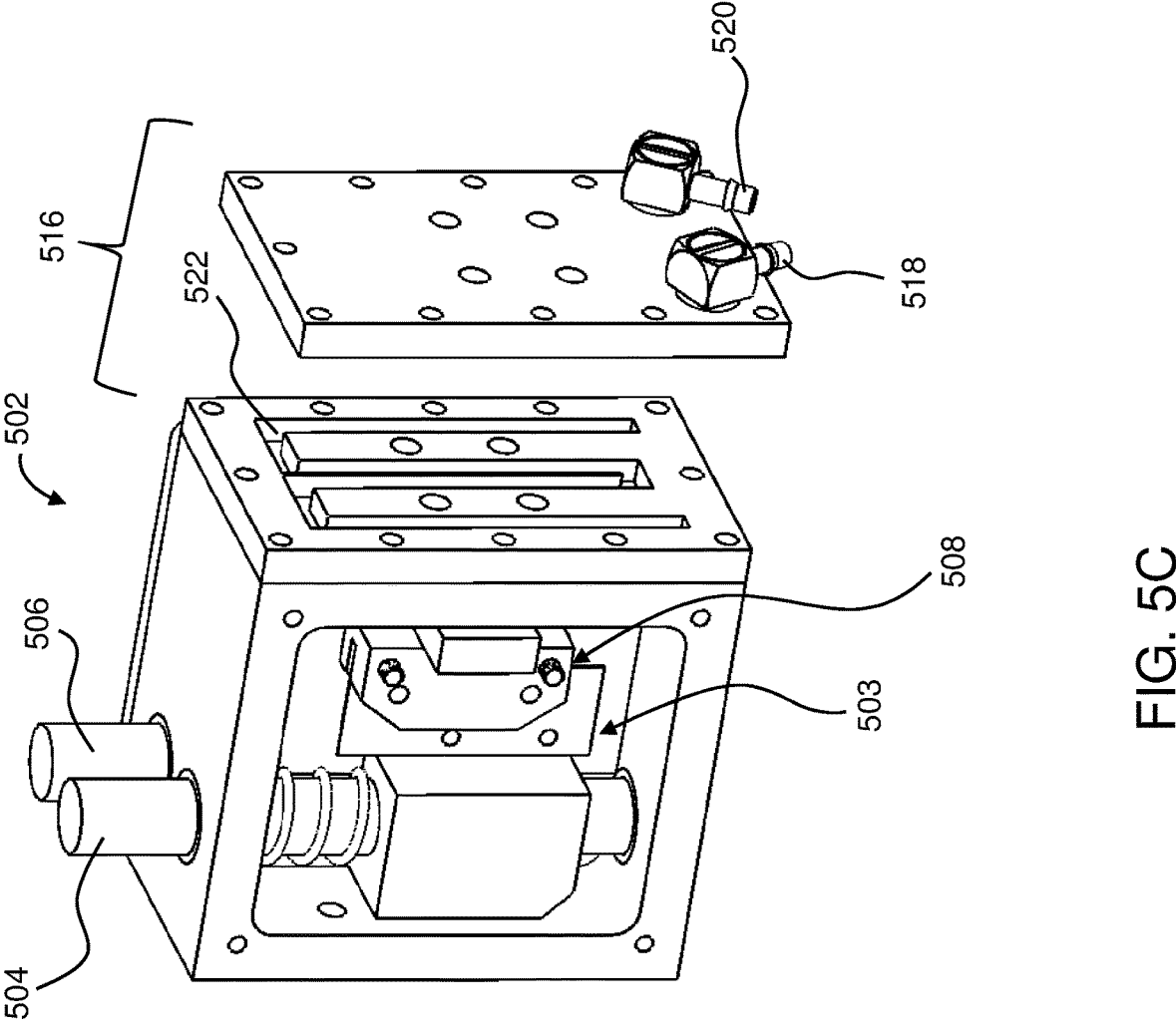
FIG. 5C is a partially exploded view of the partial cross-section of the sensor shown in FIG. 5B.

In certain implementations, the sensor 502 may include a position sensor 508 positioned relative to the first rod 504 and the second rod 506 to detected a difference in position of the first rod 504 and the second rod 506 in the radial direction. The position sensor 508 may be any one or more of various different types of sensors useful for measuring linear displacement of the first rod 504 and the second rod 506. Accordingly, examples of the position sensor 508 include one or more of the following: encoders (e.g., paired as a reader and a code strip), micropulse sensors, linear variable differential transformer sensors, laser line or point sensors, optical sensors, or vision sensors. While a single instance of the position sensor 508 is shown in FIGS. 5B and 5C, it should be appreciated that this is for the sake of clarity of illustration and multiple instances of the position sensor 508 may be used in certain instances. For example, the position of the first rod 504 and the position of the second rod 506 may be detected by respective instances of the position sensor 508.

With the first rod 504 in contact with the flange 204 and the second rod 506 in contact with the tubular section 202, the difference in position of the first rod 504 and the second rod 506 detected by the position sensor 508 corresponds to the radial offset 210 between the flange 204 and the tubular section 202 at the position of the sensor 502. Given that the sensor 502 may detect the radial offset 210 as the flange 204 and the tubular section 202 rotate in the rotation direction 109, the radial offset 210 detected by the sensor 502 at the position of the sensor 502 shall be understood to be a time-varying parameter, with the variation of the radial offset 210 corresponding to differences in the radial offset 210 corresponding to different positions along a circumference of the tube assembly 200 being formed.

In certain implementations, the first rod 504 and the second rod 506 may each be formed of a ceramic material at least along the respective portions of the first rod 504 and the second rod 506 positionable in contact with the tubular section 202 or the flange 204, as the case may be. The ceramic material may be useful, for example, for resisting wear through consistent contact with rotating surfaces of the tubular section 202 and the flange 204. Further, or instead, as described in greater detail below, the tubular section 202 and the flange 204 may be joined to one another through the use of heat, and the ceramic material may facilitate measuring the radial offset 210 near a position at which heat is applied to join the tubular section 202 and the flange 204 to one another.

In general, it should be appreciated that the rotation of the tubular section 202 and the flange 204 in the rotation direction 109 may interfere with accurately measuring the radial offset 210. For example, as the tubular section 202 and the flange 204 rotate past the sensor 502, the position of the sensor 502 relative to the tubular section 202 and the flange 204 may change in the axial direction and/or in the radial direction. More specifically, as the tubular section 202 moves axially relative to the tube rollers 102 (a movement referred to above as "walking") and the position of the flange 204 is adjusted in accordance with the movement of the tubular section 202, the position of the sensor 502 relative to the tubular section 202 and the flange 204 may inadvertently vary over time. This movement of the relative position of the sensor 502 may, in some cases, result in variation in alignment of the sensor 502 with respect to the seam 212 over time. Because this variation is related to the motion of the tubular section 202 and the flange 204 relative to the sensor 502 and is not related to the actual magnitude of the radial offset 210, it should be appreciated that inadvertent variation of the overall position of the sensor 502 relative to the flange 204 (and, thus, the seam 212) may introduce error into the measurement of the radial offset 210. Thus, to reduce the error introduced by inadvertent changes in the overall relative position of the sensor 502 as the tubular section 202 and the flange 204 rotate, the sensor 502 may be positionable with two degrees of freedom to facilitate tracking the seam 212 as the tubular section 202 and the flange 204 rotate in the rotation direction 109.

As an example, the sensing unit 106 may include a first cylinder 510 and a second cylinder 512. The first cylinder 510 may be movable to push the sensor 502 in the axial direction into contact with the flange 204. Further, or instead, the second cylinder 512 may be movable to push the sensor 502 in a radial direction into contact with the flange 204 and the tubular section 202. In certain instances, one or more of the first cylinder 510 and the second cylinder 512 may be actively driven to push the sensor 502 in each respective direction. Additionally, or alternatively, one or more of the first cylinder 510 and the second cylinder 512 may passively move the sensor 502 to track the position of the flange 204 at any given point in time. As an example, the first cylinder 510 may be an air cylinder biasing the sensor 502 in the axial direction into contact the flange 204. As another nonexclusive example, the second cylinder 512 may be an air cylinder biasing the sensor 502 in the radial direction into contact with the tubular section 202 and the flange 204.

In certain instances, one or both of the first cylinder 510 and the second cylinder 512 may be actuatable to retract the sensing unit 106 away from the tubular section 202 and the flange 204. This may be useful, for example, for reducing the likelihood of damage to the sensing unit 106 and/or to the tube assembly 200 as the tube assembly 200 is removed from the fit-up system 100. Further, or instead, retracting the sensing unit 106 may facilitate initially positioning the tubular section 202 and the flange 204 in the fit-up system 100 at the beginning of a process to form the tube assembly 200.

In some implementations, the fit-up system 100 may further include a joining unit 112 positioned relative to the pinch 406 defined by the fitting unit 104 such that the joining unit 112 may join a rotating point of the flange 204 to the tubular section 202 following rotation of the given point of the flange 204 through the pinch 406. Thus, more specifically, the joining unit 112 may join the flange 204 to the tubular section 202 at the rotating point after the fitting unit 104 has adjusted the radial offset 210 of the rotating point. That is, adjusting the radial offset 210 prior to joining the flange 204 to the tubular section 202 has readily appreciable advantages with respect to the degree of adjustment achievable in the radial offset 210 and the force required to achieve such adjustment.

The joining unit 112 may include, for example, a weld head 514 suitable for joining the tubular section 202 and the flange 204 to one another using any welding technique compatible with the respective materials of the tubular section 202 and the flange 204. A variety of welding techniques are known in the art and may be adapted for joining the tubular section 202 and the flange 204 to one another as contemplated herein. This can, for example, include any welding technique that melts the flange 204 or other material along the seam 212, optionally along with a filler material added to the joint to improve the strength of the bond. Conventional welding techniques suitable for structurally joining metal include, by way of example and not limitation: gas metal arc welding (GMAW), including metal inert gas (MIG) and/or metal active gas (MAG); submerged arc welding (SAW); laser welding; and gas tungsten arc welding (also known as tungsten, inert gas or "TIG" welding); and many others. These and any other techniques suitable for forming a structural bond between the tubular section 202 and the flange 204 may be adapted for use in the weld head 514 as contemplated herein. Mechanical coupling imparted by the weld head 514 may be, for example, continuous along the seam 212 to provide enhanced structural strength to the tube assembly 200 being formed.

In some instances, the weld head 514 may complete a full weld in a single continuous rotation of the tubular section 202 and the flange 204 in the rotation direction 109. However, in instances in which materials of the tubular section 202 and/or the flange 204 are too thick for a single weld pass to achieve a suitable weld quality, the weld head 514 may continuously join the tubular section 202 and the flange 204 with a single tack pass. Continuing with this example, additional weld passes may be completed by the weld head 514. Additionally, or alternatively, the tubular section 202 and the flange 204 may be joined to one another with a single tack pass and removed from the fit-up system 100 such that additional welding passes may be completed in a separate welding unit.

In general, the sensing unit 106 may be fixed relative to (e.g., directly mechanically coupled to) the joining unit 112 to detect the radial offset 210 at a fixed location relative to the joining unit 112. In certain instances, the sensing unit 106 may be fixed relative to the joining unit 112 to detect the radial offset 210 at a point at or after the joining unit 112. That is, as the tubular section 202 and the flange 204 are being or have been joined to one another at a rotating point and that rotating point moves through the fixed location of the sensing unit 106, the sensing unit 106 may detect the radial offset 210. Detecting the radial offset 210 at or just after the weld may advantageously reduce the likelihood of a change in the radial offset 210 between the point at which the radial offset 210 is detected and when the tubular section 202 and the flange 204 are joined to one another. While the sensing unit 106 may be fixed relative to the joining unit 112 to measure the radial offset 210 at or after the joining unit 112 in some instances, it should be appreciated that the sensing unit 106 may additionally or alternatively be fixed relative to the joining unit 112 to measure the radial offset 210 at a rotating point of the tubular section 202 and the flange 204 before that rotating point moves past the joining unit 112. Such relative positioning may be useful, for example, for facilitating actively adjusting the radial offset 210 at the rotating point before the rotating point moves past the joining unit 112.

Combining aspects of the foregoing examples, it should be generally understood that a point on the flange 204 rotating in the rotation direction 109 may pass through the components of the fit-up system in the following order: through the fitting unit 104 (where the radial offset 210 corresponding to the rotating point may be adjusted), through the joining unit 112 (where the flange 204 may be joined to the tubular section 202 at the rotating point), and through the sensing unit 106 (where the sensor 502 may detect the radial offset 210 at the rotating point). In general, to facilitate accurate control of the radial offset 210 according to any one or more of the control techniques described herein, it should be appreciated that it may be useful to carry out these operations in proximity to each other. For example, such proximity may reduce temporal delay in an automated or semi-automated feedback control loop carried out by the controller 108.

To facilitate detecting the radial offset 210 in close proximity to the joining unit 112 in instances in which the joining unit 112 includes the weld head 514, the sensing unit 106 may generally include features useful for withstanding the heat and electrical fields associated with proximity to the weld head 514. Thus, as described above, at least portions of the first rod 504 and the second rod 506 may be formed of a ceramic material capable of withstanding contact with high temperature surfaces of the tubular section 202 and the flange 204 in the vicinity of the weld head 514 as the weld head 514 welds the tubular section 202 and the flange 204 together at the seam 212. As an example, the ceramic material may include one or more of alumina or alumina-silica.

Additionally, or alternatively, the sensor 502 may include a cooler 516 in thermal communication with a volume 503 defined by the sensor 502 to cool any one or more components of the sensor 502 at least partially disposed in the volume 503 (e.g., a portion of the first rod 504, a portion of the second rod 506, and the position sensor 508). The cooler 516 may include a fluid inlet 518 and a fluid outlet 520 each in fluid communication with a cooling chamber 522 defined by the cooler 516. In use, the cooling fluid may enter the cooler 516 via the fluid inlet 518, move through the cooling chamber 522 to remove heat from the sensor 502, and exit the cooler 516 via the fluid outlet 520. In some instances, the cooler 516 may be in thermal communication with the volume 503 via thermal conduction. For example, the cooler 516 may be adjacent to the volume 503. As another example, the cooler 516 may at least partially define the volume 503. Additionally, or alternatively, the cooling fluid may be any one or more of various different fluids having a heat capacity suitable for providing cooling to the sensor 502. In some instances, the cooling fluid may provide cooling to the sensor 502 without changing phase in the cooler 516. This may be useful for, among other things, controlling the rate of flow of the cooling fluid through the cooler 516. In other implementations, the cooling provided by the cooling fluid to the sensor 502 may include a phase change. Given its ubiquity and case of handling, water may be a particularly useful cooling fluid for use in the cooler 516.

In general, the controller 108 may include any processing circuitry to receive sensor signals and responsively control operation of the fit-up system 100. This may, for example, include dedicated circuitry to execute processing logic as desired or required, or this may include a microcontroller, a proportional-integral-derivative controller, or any other programmable process controller. This can also or instead include a general-purpose microprocessor, memory, and related processing circuitry configured by computer-executable code to perform the various control steps and operations described herein. More specifically, the controller 108 may control the radial offset 210 of the tubular section 202 and the flange 204 relative to one another as the tubular section 202 and the flange 204 rotate in the rotation direction 109 in a continuous process for fitting the flange 204 to the tubular section 202 to form the tube assembly 200. For the sake of illustration and clarity of explanation, the controller 108 is described herein as being a central controller. It shall be understood, however, aspects of the controller 108 may be spatially distributed without departing from the scope of the present disclosure.

The controller 108 may include a processing unit 114, a storage medium 116 (e.g., a non-transitory, computer-readable storage medium), and a user interface 118. The storage medium 116 and the user interface 118 may be in electrical communication with the processing unit 114. The storage medium 116 may store computer-executable instructions that, when executed by the processing unit 114, cause the fit-up system 100 to perform one or more of the fitting methods described herein. The processing unit 114 may, further or instead, be responsive to input received through the user interface 118 (e.g., a keyboard, a mouse, and/or a graphical user interface) such that the processing unit 114 is responsive to input received through the user interface 118 as the processing unit 114 executes one or more of the fitting methods described herein.

In certain implementations, the tubular section 202 and the flange 204 may be initially joined to one another in a small section (e.g., by a tack weld). The radial offset 210 may be set either manually or automatically. Further, or instead, a slope of the radial offset 210 may be set for compatibility with continued correct fit-up. Once the small section of the flange 204 is joined to the tubular section 202, the tubular section 202 and the flange 204 may be rotated and at least the adjustment of the radial offset 210 may proceed automatically as the processing unit 114 carries out one or more computer executable instructions stored on the storage medium 116

Figure 6:
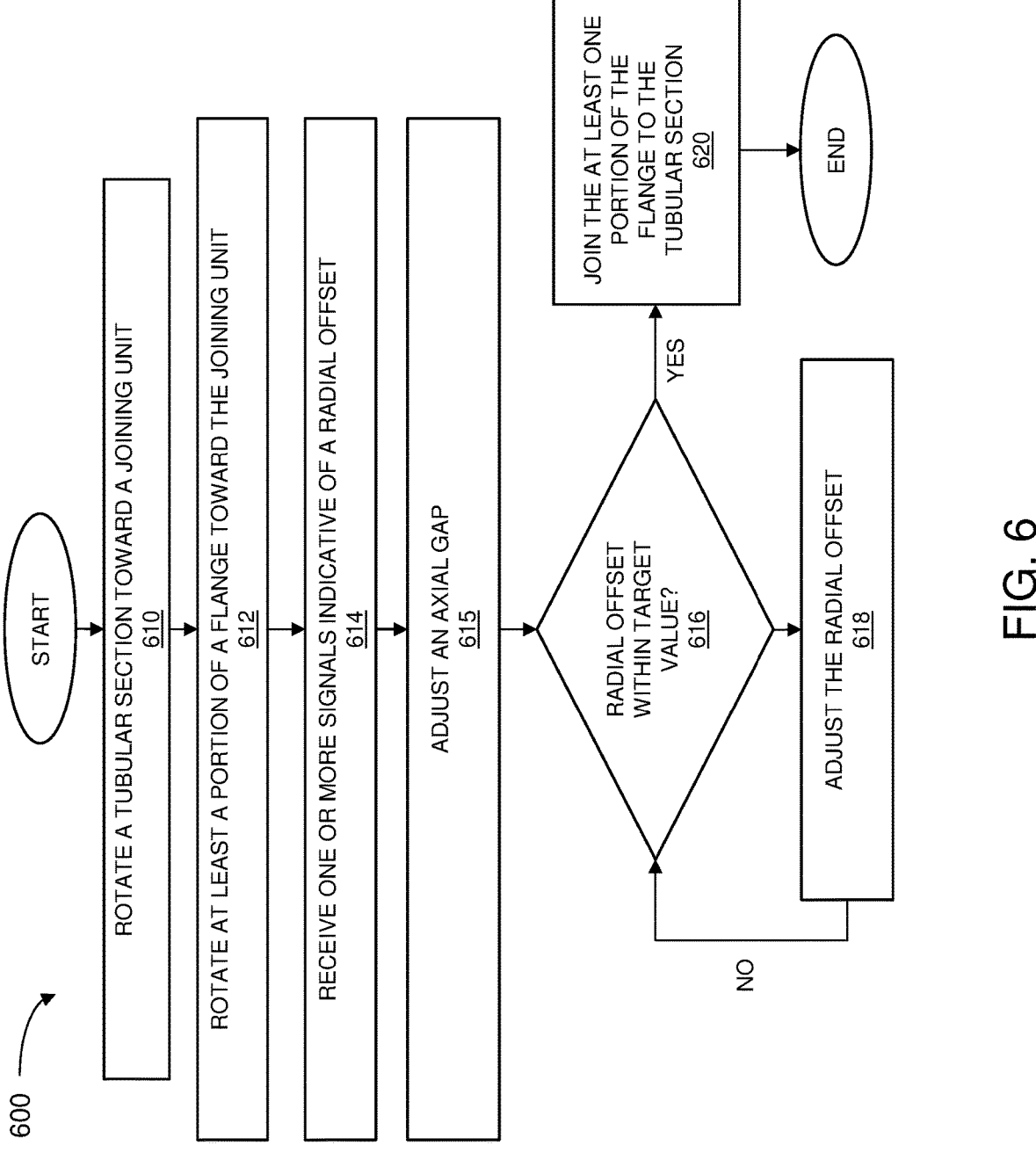
FIG. 6 is a flowchart of an exemplary method of fitting a flange to a tubular section to form a tubular assembly.

FIG. 6 is a flowchart of an exemplary method 600 of fitting a flange to a tubular section to form a tubular assembly. It should be appreciated that the exemplary method 600 may be carried out, for example, by any one or more of the fit-up systems (e.g., the fit-up system 100 in FIG. 1) described herein to form any one or more of the tubular assemblies (e.g., the tube assembly 200 in FIGS. 1 and 2)

described herein. For example, one or more steps of the exemplary method 600 may be carried out by a processing unit of a controller (e.g., the processing unit 114 of the controller 108 in FIG. 1). Additionally, or alternatively, one or more steps in the exemplary method 600 may be carried out by an operator providing inputs (e.g., through the user interface 118 of the controller 108 in FIG. 1) to the controller.

As shown in step 610, the exemplary method 600 may include rotating the tubular section in a direction toward a joining unit. In general, the tubular section may be any one or more of the tubular sections described herein, and the joining unit may be any one or more of the joining units described herein. Thus, for example, the tubular section may be supported on a plurality of tube rollers according to any one or more of the various different techniques described herein. As a more specific example, each tube roller in the plurality of tube rollers may be spaced apart from one another circumferentially along an outer surface of the tubular section. By driving one or more of the tube rollers and/or an end roller in contact with the outer surface of the tubular section, the tubular section may rotate in a rotation direction toward the joining unit, as also described herein.

As shown in step 612, the exemplary method 600 may include rotating at least one portion of the flange in the direction toward the joining unit. In general, the at least one portion of the flange should be generally understood to include at least one portion of any one or more of the various different types of flanges described herein. Thus, for example, the at least one portion of the flange may be a circumferential section of a segmented flange. In instances in which the flange is segmented, sections of the flange may be supported on a structure that holds these sections in a circumferential configuration. In certain instances, each section of the segmented flange may be attached (e.g., through an initial tack weld) individually to the tubular section as part of an initial setup. Further, or instead, the at least one portion of the flange may be a unitary flange defining an enclosed, substantially circular shape.

In general, rotating the at least one portion of the flange in the direction toward the joining unit may include engaging the at least one portion of the flange according to any one or more of the techniques described herein (e.g., using the fitting unit 104 of FIG. 1). Thus, for example, rotating the at least one portion of the flange may include forming a pinch between two components, with the pinch restricting movement of the at least one portion of the flange in the radial direction and the axial direction as the at least one portion of the flange rotates in the direction toward the joining unit under rotational force imparted by the tubular section mechanically coupled to the at least one portion of the flange. As an example, a locating roller and a pusher roller may collectively define a pinch, with first surface of the flange engaged by the pusher roller, and a second surface of the at least one portion of the flange engaged with the locating roller according to any one or more of the various different techniques described herein.

The at least one portion of the flange and the tubular section may be rotated in the same rotational direction (e.g., clockwise or counterclockwise) to move these components toward the joining unit. In certain implementations, rotating the at least one portion of the flange and the tubular section in the same rotational direction may include mechanically coupling the at least one portion of the flange and the tubular section together initially (e.g., through a tack weld at start-up). With the at least one portion of the flange and the tubular section coupled together in this way, the at least one portion of the flange and the tubular section may move together—at the same rotational speed and in the same direction-toward the joining unit. Additionally, or alternatively, the rotation of the tubular section and the at least one portion of the flange in the direction toward the joining unit may be about an axis perpendicular to a direction of gravity. This orientation of rotation of the tubular section and the at least one portion of the flange may be useful, for example, for working with long tubular sections useful for forming large-scale tubular assemblies. More specifically, rotating the tubular section and the at least one portion of the flange about an axis perpendicular to the direction of gravity, the length of the tubular section may be decoupled from the ceiling height of a manufacturing facility in which the exemplary method 600 is carried out. To form a given tubular structure, longer lengths of the tubular section require fewer welds which, in turn, may reduce manufacturing time and cost. Additionally, or alternatively, by rotating the tubular section and the at least one portion of the flange about an axis perpendicular to the direction of gravity, components of the fit-up system may be conveniently located near the ground, where components of the fit-up system may be readily accessed for set-up, operation, and/or maintenance. Further, or instead, rotating the tubular section and the at least one portion of the flange about an axis perpendicular to the direction of gravity may position the seam between the tubular section and the at least one portion of the flange along a substantially horizontal surface. This orientation may be useful for joining the tubular section and the at least one portion of the flange using submerged arc welding. As compared to certain other types of welding, submerged arc welding may be performed more quickly, thus facilitating welding as the tubular section and the at least one portion of the flange move in the rotation direction.

As shown in step 614, the exemplary method 600 may include receiving one or more signals indicative of a radial offset between the tubular section and the at least one portion of the flange. Thus, for example, the one or more signals indicative of the radial offset may be received from the one or more sensors as the tubular section and the at least one portion of the flange move in the direction toward the joining unit. Additionally, or alternatively, the one or more signals indicative of the radial offset may be continuous to provide a correspondingly continuous indication of the radial offset as the tubular section and the at least one portion of the flange rotate past the sensor. Continuing with this example, such a continuous indication of the radial offset may be useful as a feedback signal to achieve appropriate fit-up of the flange to the tubular section.

In general, the one or more signals may correspond to detection carried out by any one or more of various different types of sensors (e.g., the sensor 502 in FIG. 5) useful for detecting a parameter that may be indicative of the radial offset. Thus, for example, the one or more signals indicative of the radial offset may include a radial distance between a location on the tubular section and a corresponding circumferential location on the flange. This radial distance may be, for example, directly measured through contact with the tubular section and the at least one section of the flange. As may be appreciated, the one or more signals indicative of the radial offset may be received from different sources and combined with one another to arrive at a measurement or at least an approximation of the radial offset.

While directly measuring the radial offset may be useful in certain implementations to facilitate accurate control over the radial offset, the one or more signals may be used to determine the radial offset through one or more indirect techniques. For example, in a radial direction, the at least one portion of the flange may be more rigid than the tubular section. Thus, continuing with this example, it may be useful to assume that the at least one portion of the flange is inflexible such that the radial offset may be estimated (e.g., according to a model or a known physical relationship) based on a known radial position of the at least one portion of the flange and one or more signals indicative of a shape of the tubular section at a given position. Thus, continuing still further with this example, the one or more signals indicative of the radial offset may include one or more of the following: a radius of curvature of the tubular section between two tube rollers of the plurality of tube rollers; a stress level in the tubular section; a distance between two points along a circumference of the tubular section; or a distance between a point on the tubular section and a fixed point external to the tubular section. Further, or instead, the one or more signals indicative of the radial offset may include one or more of the following: torque required to actuate at least one tube roller of the plurality of tube rollers; rotational speed of at least one tube roller of the plurality of tube rollers; or a position (e.g., a radial position) of at least one tube roller of the plurality of tube rollers.

In certain implementations, the one or more signals indicative of the radial offset may include a user input (e.g., via the user interface 118 of the controller 108 in FIG. 1). For example, a user may visually observe the radial offset as being beyond a threshold value indicated by markings on the tubular section and/or the at least one portion of the flange. Additionally, or alternatively, at slow enough rotational speeds, the user input may be indicative of a manual measurement performed by the user as the tubular section and/or the at least one portion of the flange rotate in the direction of the joining unit.

As shown in step 616, the exemplary method 600 may include comparing the one or more signals indicative of the radial offset to a target value. In certain implementations, the target value may be based on one or more user inputs. For example, the one or more user inputs may be indicative of an overall dimensional tolerance of the tube assembly being formed. Further, or instead, the one or more user inputs may be indicative of dimensions of the tubular section and the at least one portion of the flange. As an example, the target value may be based on measurements of circumferences of the tubular section and the flange formed from the at least one portion of the flange (e.g., a segmented flange or a unitary hoop). For example, in instances in which the tubular section and the flange have the same circumferential measurement, the target value may be set to 0, at least initially. Additionally, or alternatively, in instances in which the tubular section and the flange have different circumferential measurements such that $D_{flange}=D_0$ and $D_{tube}=D_0+\Delta D$ then a target value, at least initially, of $\Delta D/2$ may facilitate keeping the tubular section and the flange aligned as the flange is secured to the tubular section.

In some implementations, the target value may vary as the at least one portion of the flange and the tubular section rotate in the direction toward the joining unit. For example, the target value may vary according to a predetermined function (e.g., a slope), a model, or a combination thereof. Additionally, or alternatively, the target value may vary over time to account (e.g., as part of a feedback control technique) for accumulation in error of the radial offset as the flange is joined to the tubular section to form the tubular assembly.

As shown in step 618, the exemplary method 600 may include, based at least in part on the comparison of the one or more signals to the target value, adjusting the radial offset between the at least one portion of the flange and the tubular section as the tubular section and the at least one portion of the flange each rotated in the direction toward the joining unit. In general, the adjustment of the radial offset may be carried out through actuation of any one or more components described herein for moving the tubular section and the flange relative to one another. Thus, for example, adjusting the radial offset may include moving at least one tube roller of the plurality of tube rollers in a direction having a radial component relative to the tubular section as the tubular section and the at least one portion of the flange rotate in the direction toward the joining unit. Further, or instead, adjusting the radial offset may include pushing the at least one portion of the flange in a direction having a radial component relative to the tubular section.

In some instances, pushing the tubular section and the flange in one or more directions having a radial component may be carried out at separate times. That is, as an example, the at least one portion of the flange may be pushed in a direction having a radial component relative to the at least one portion of the flange as the plurality of rollers remain in a fixed radial position and in a fixed axial position as the at least one portion of the flange and the tubular section each rotate in the direction toward the joining unit. Further, or instead, one or more of the fixed radial position or the fixed axial position of the at least one tube roller of the plurality of tube rollers may be adjusted as the tubular section is stationary. Given the relative size of the tubular section relative to the flange in some large-scale industrial applications, adjusting the position of the tubular section while the tubular section is stationary may be useful for retaining adequate control over the position of the tubular section. Alternatively, in some implementations, pushing the tubular section and the flange in one or more directions having a radial component may be carried out contemporaneously such that the at least one portion of the flange may be moved, in a direction having a radial component relative to the at least one portion of the flange, as the at least one tube roller of the plurality of tube rollers moves in the radial direction of the tubular section.

As shown in step 620, the exemplary method 600 may include joining the at least one portion of the flange to the tubular section as the tubular section and the at least one portion of the flange rotate in the direction toward the joining unit. In general, the at least one portion of the flange and the tubular section may be joined to one another according to any one or more of the techniques described herein. Thus, for example, joining may include welding (e.g., as described with respect to the weld head 514 in FIG. 5). Additionally, or alternatively, however, joining the at least one portion of the flange and the tubular section to one another may include mechanically coupling these components through the use of an adhesive and/or mechanical fastening (e.g., rivets, crimping, etc.), as may be appropriate for a particular application.

While certain implementations have been described, other implementations are additionally or alternatively possible.

Figure 7:
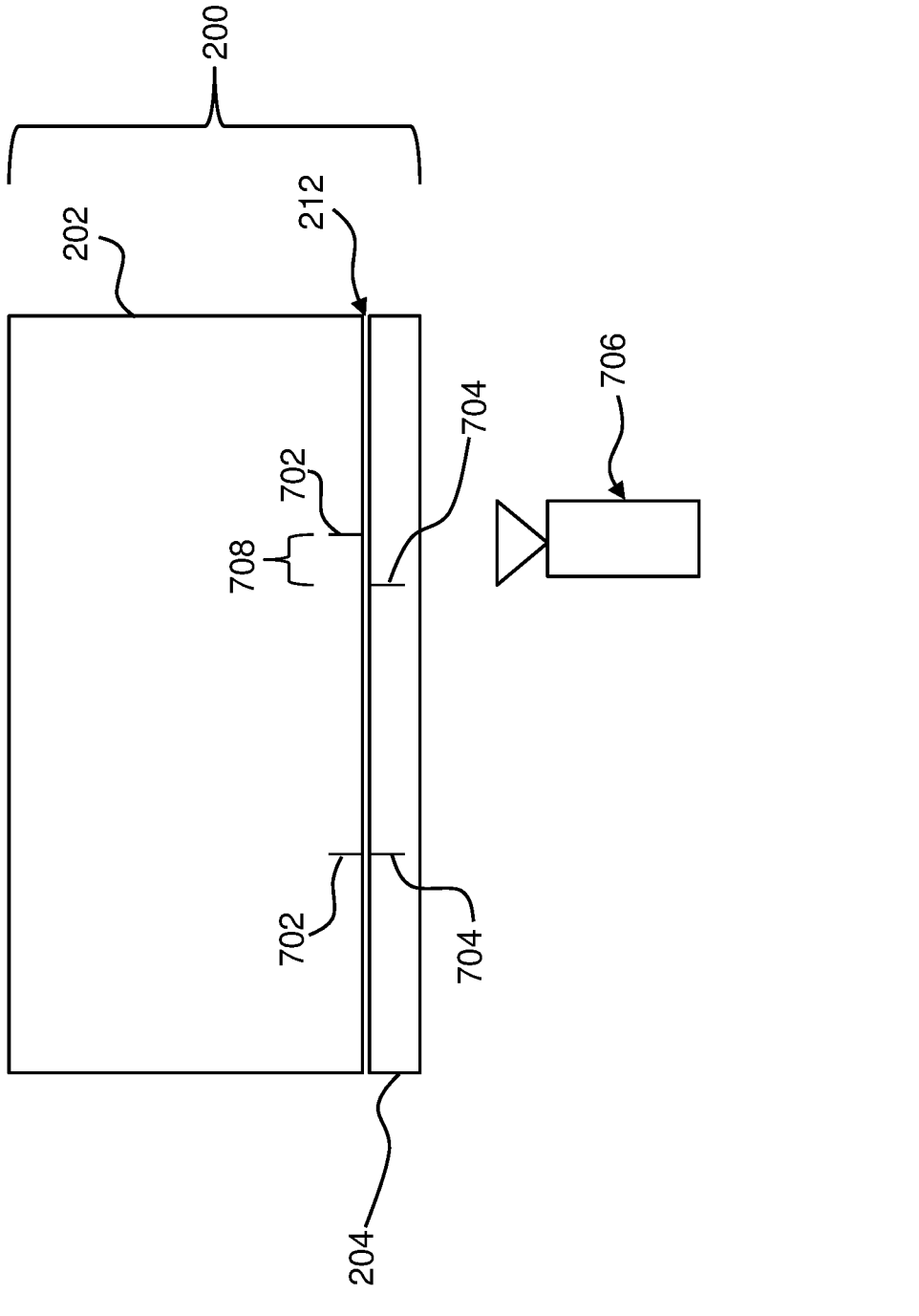
FIG. 7 is a schematic representation of a top view of a system detecting tick marks on a flange and on a tubular section to determine a target value for a radial offset of the flange and the tubular section.

For example, while the target value for the radial offset has been described as being variable according to certain techniques, other approaches to temporally varying the target value are additionally or alternatively possible. For example, referring now to FIGS. 1, 6 and 7, the tubular section 202 may include first tick marks 702 along the circumference of the tubular section 202, and the flange 204 may include second tick marks 704 along the circumference of the flange 204. In the ideal case, in which the radial offset is identical to the target value around the entire circumference of the tube assembly 200, the first tick marks 702 on the tubular section 202 may each align with corresponding instances of the second tick marks 704 on the flange 204 around the entire circumference of the tube assembly 200. In practical implementations, however, the radial offset may deviate from the target value at certain circumferential points as the tube assembly 200 is being formed. As these differences accumulate, one or more instances of the first tick marks 702 on the tubular section 202 may become misaligned relative to corresponding one or more instances of the second tick marks 704 on the flange 204. By measuring the misalignment, the target value may be adjusted, as the tube assembly 200 is being formed, to account for the previous radial misalignment. Further, or instead, in instances in which the tubular section 202 and the flange 204 have different circumferences, maintaining alignment of the first tick marks 702 to the second tick marks 704 may, in turn, maintain appropriate alignment of the different circumferences. That is, aligning the first tick marks 702 to the second tick marks 704 may be useful for aligning the tubular section 202 and the flange 204 without the need to measure the circumference of each component. This is a significant advantage in instances in which the tubular section 202 and the flange 204 are large (e.g., in implementations associated with forming tubular structures for wind towers), given the difficulty associated with accurately measuring the respective circumferences of the tubular section 202 and the flange 204 when these components are large.

In certain implementations, an alignment sensor 706 (e.g., a camera) may be directed toward the seam 212 defined by the tubular section 202 and the flange 204. In use, the alignment sensor 706 may detect a circumferential spacing 708 (with nonzero values indicative of misalignment) between the first tick marks 702 on the tubular section 202 relative to the second tick marks 704 on the flange 204. The alignment sensor 706 may be in electrical communication with the controller 108 such that the exemplary method 600 may include adjusting the target value based on the circumferential spacing. For example, the exemplary method 600 may include receiving an indication of the circumferential spacing 708, and adjusting the target value for the radial offset based on the circumferential spacing 708. Additional or alternative details and implementations for adjusting alignment of components of a tubular assembly based on tick marks are provided by way of non-limiting example in U.S. Patent Application Publication 20160375476, entitled Spiral Forming, the entire contents of which are hereby incorporated herein by reference.

Figure 8:
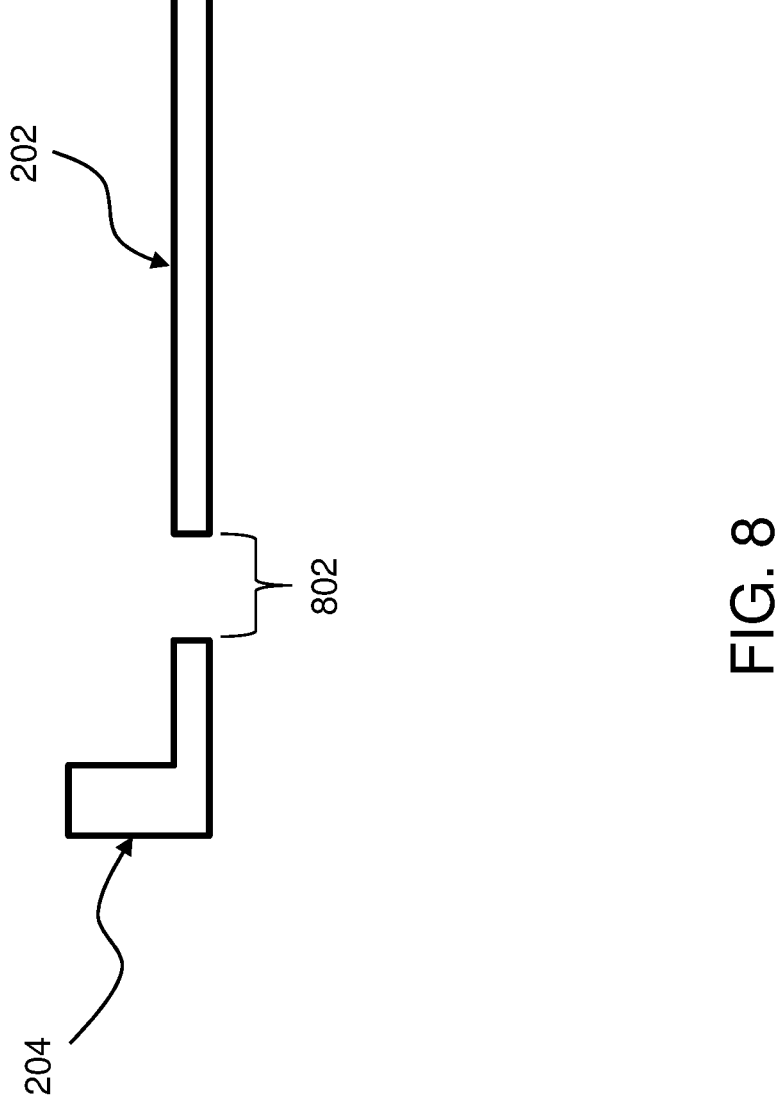
FIG. 8 is a schematic representation of a cross-sectional side view of a flange axially spaced from a tubular section by an axial gap.

While fit-up systems and methods have been described with respect to adjustment of a radial offset between a tubular section and a flange, other parameters may be additionally or alternatively adjusted to achieve appropriate fit-up of these components. For example, referring now to FIGS. 1, 4A, and 8, the fitting unit 104 may additionally or alternatively include a gap sensor 418. Examples of the gap sensor 418 include one or more of a laser line sensor, a mechanical gap sensor, and an optical sensor including a camera.

In use, the gap sensor 418 measures an axial gap 802 between the tubular section 202 and the flange 204 as the tubular section 202 and the flange 204 rotate in the rotation direction 109. For example, the gap sensor 418 may be supported on the fit-up system 100 at any position suitable for measuring the axial gap 802 at any one or more positions along the path of movement of the tubular section 202 and the flange 204 in the rotational direction 109, prior to joining of the tubular section 202 and the flange 204 at the one or more positions. Thus, by way of example and not limitation, the gap sensor 418 may be positioned to detect the axial gap 802 at or near the pinch 406. Further, or instead, the gap sensor 418 is shown and described as a single sensor, it should be appreciated that multiple instances of the gap sensor 418 may be used to measure the axial gap 802 at various different positions along the path of movement of the tubular section 202 and the flange 204 in the rotational direction 109.

In general, the axial gap 802 may be controlled to accommodate the joining process. That is, the axial gap 802 may be set to facilitate mechanically coupling the tubular section 202 and the flange 204 to one another. For example, the joining unit 112 may form a weld in the axial gap 802. Additionally, or alternatively, the tubular section 202 and the flange 204 may be joined to one another in the axial gap 802 using brazing, soldering, glue, mechanical connections, or any combination thereof.

The controller 108 may, for example, receive an indication of the axial gap 802 based on a signal received from the gap sensor 418 and/or a signal received as a manual input (e.g., at the user interface 118) from an operator. The signal received from the operator may be based on one or more measurements made by the gap sensor 418, in certain implementations. Additionally, or alternatively, while manual control by an operator may be carried out based on information from the gap sensor 418, it should be appreciated that manual control by the operator may be achieved without information from the gap sensor 418 (e.g., in instances in which the fit-up system 100 does not include a gap sensor).

Based at least in part on the indication of the axial gap 802, the controller 108 may actuate the second actuator 412 of the fitting unit 104 to adjust the position of the pinch 406 (e.g., by moving at least the locating roller 402) in the axial direction. With the flange 204 disposed in the pinch 406, such movement of the pinch 406 moves the flange 204 in the axial direction. As the fitting unit 104 adjusts the position of the pinch 406 in the axial direction, the tubular section 202 may remain substantially fixed in the axial direction such that the movement of the pinch 406 and, thus, the flange 204 in the axial direction changes the axial gap 802.

Referring now to FIGS. 1 and 6, the controller 108 may adjust the axial gap 802 as part of the exemplary method 600. For example, as shown in step 615, the exemplary method 600 may include adjusting an axial gap. In certain instances, an axial gap may be compared to a target gap and, based on the comparison of the axial gap to the target gap, the at least one portion of the flange may be moved in an axial direction. Such movement of the at least one portion of the flange in the axial direction may be actuated, for example, as the at least one portion of the flange and the tubular section rotate in the direction toward the joining unit. Additionally, or alternatively, the at least one portion of the flange may be moved in the axial direction while the tubular section remains fixed in the axial direction (e.g., during an initial set-up).

While fit-up systems and fitting methods have generally been described herein with respect to certain types of flanges, it should be appreciated that these fit-up systems and fitting methods may be used with respect to any one or more of various different types of flanges to form tubular assemblies, unless otherwise specified or made clear from the context.

Figure 9:
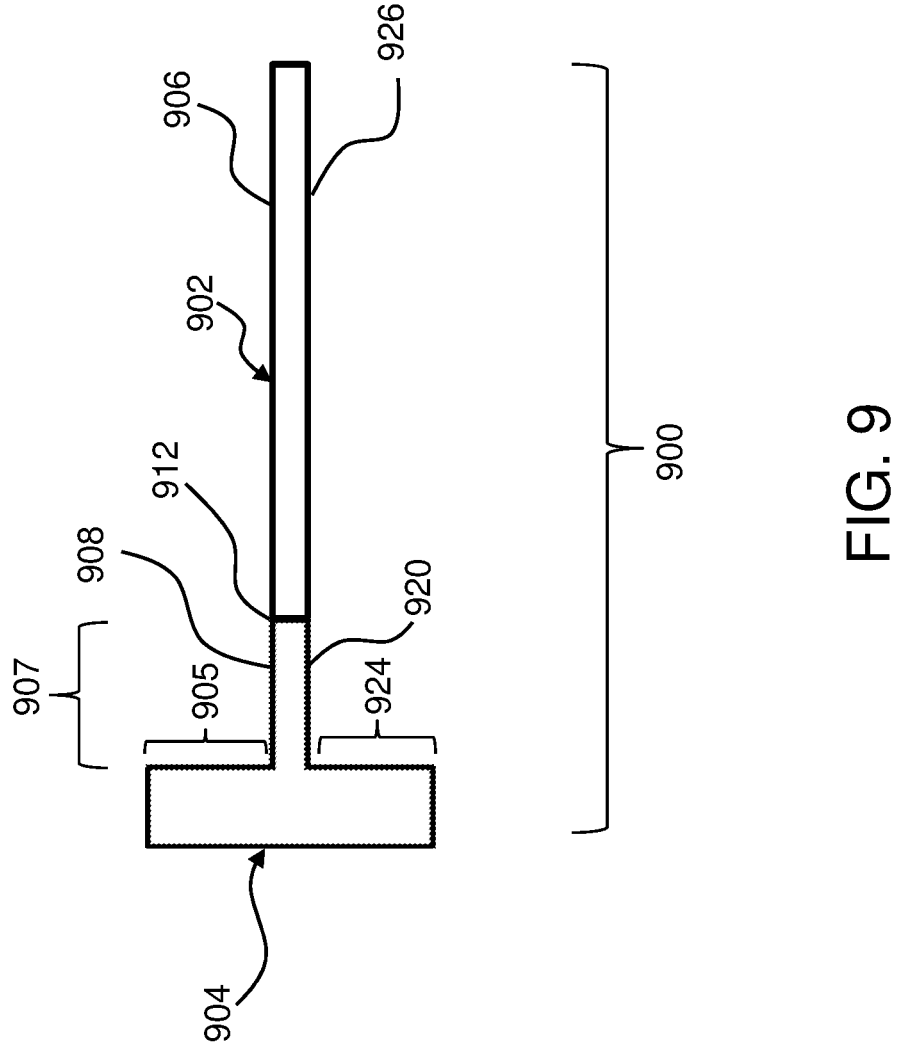
FIG. 9 is a schematic representation of a tubular assembly including a T-shaped flange mechanically coupled to a tubular section.

For example, referring now to FIG. 9, a tubular assembly 900 may include a tubular section 902 coupled to a flange 904 at a seam 912. For the sake of clear and efficient description, elements of the tubular assembly 900 should be understood to be analogous to or interchangeable with elements with corresponding 200-series element numbers (e.g., in FIGS. 2A and 2B) described herein, unless otherwise explicitly made clear from the context and, therefore, are not described separately from counterpart 200-series element numbers, except to note differences or emphasize certain features. Thus, for example, the tubular section 902 of the tubular assembly 900 should be understood to be analogous to the tubular section 202 of the tube assembly 200 (FIGS. 2A and 2B). Further, or instead, the tubular assembly 900 may be formed using any one or more of the fit-up systems and methods described herein, unless otherwise stated or made clear from the context.

The flange 904 may include an inner surface 908 and an outer surface 920 opposite the inner surface 908. The flange 904 may include a first radial section 905 and a second radial section 924. The first radial section 905 may extend radially away from the inner surface 908, and the second radial section 924 may extend radially outward away from the outer surface 920. With the first radial section 905 and the second radial section 924 disposed opposite one another, the overall shape of the flange 904 may be a "T." In use, a locating unit (e.g., the fitting unit 104 in FIG. 1) may engage one or both of the first radial section 905 and the second radial section 924 to control axial positioning of the flange 904 relative to the tubular section 902. Further, or instead, the locating unit may control a radial offset between the tubular section 902 and the flange 904 according to any one or more of the techniques described herein for controlling the radial offset.

As another example, while the flange 904 may have an axial portion 907 (e.g., as indicated by the inner surface 908 and the outer surface 920) suitable for accommodating sensing of a radial position and/or axial position of the flange 904, it should be appreciated that the axial portion 907 may, in some instances, have small dimensions approaching and including zero. That is, continuing with the example in which the flange 904 does not have an axial portion, first radial section 905 and the second radial section 924 of the flange 904 may be mounted directly to the tubular section 902 at the seam 912. Implementations based on this flange configuration (sometimes referred to as a "flat flange") may include, for example, detecting a radial offset between the flange 904 and the tubular section 902 by detecting a position of a respective maximum radial position of one or both of the first radial section 905 or the second radial section 924 relative to an inner surface 906 or an outer surface 926.

Figure 10A:
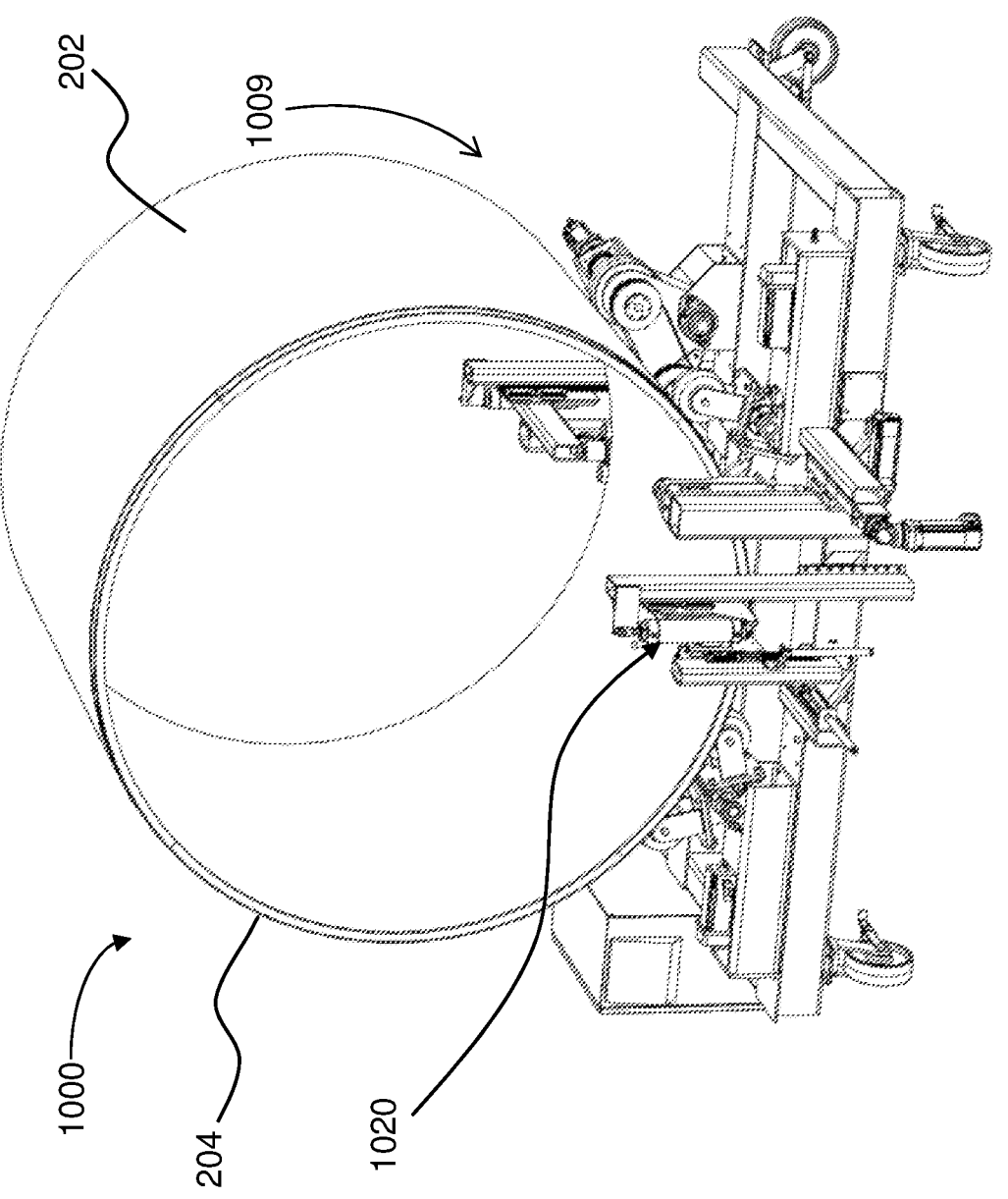
FIG. 10A is a perspective view of a fit-up system including a hold-down unit.
Figure 10B:
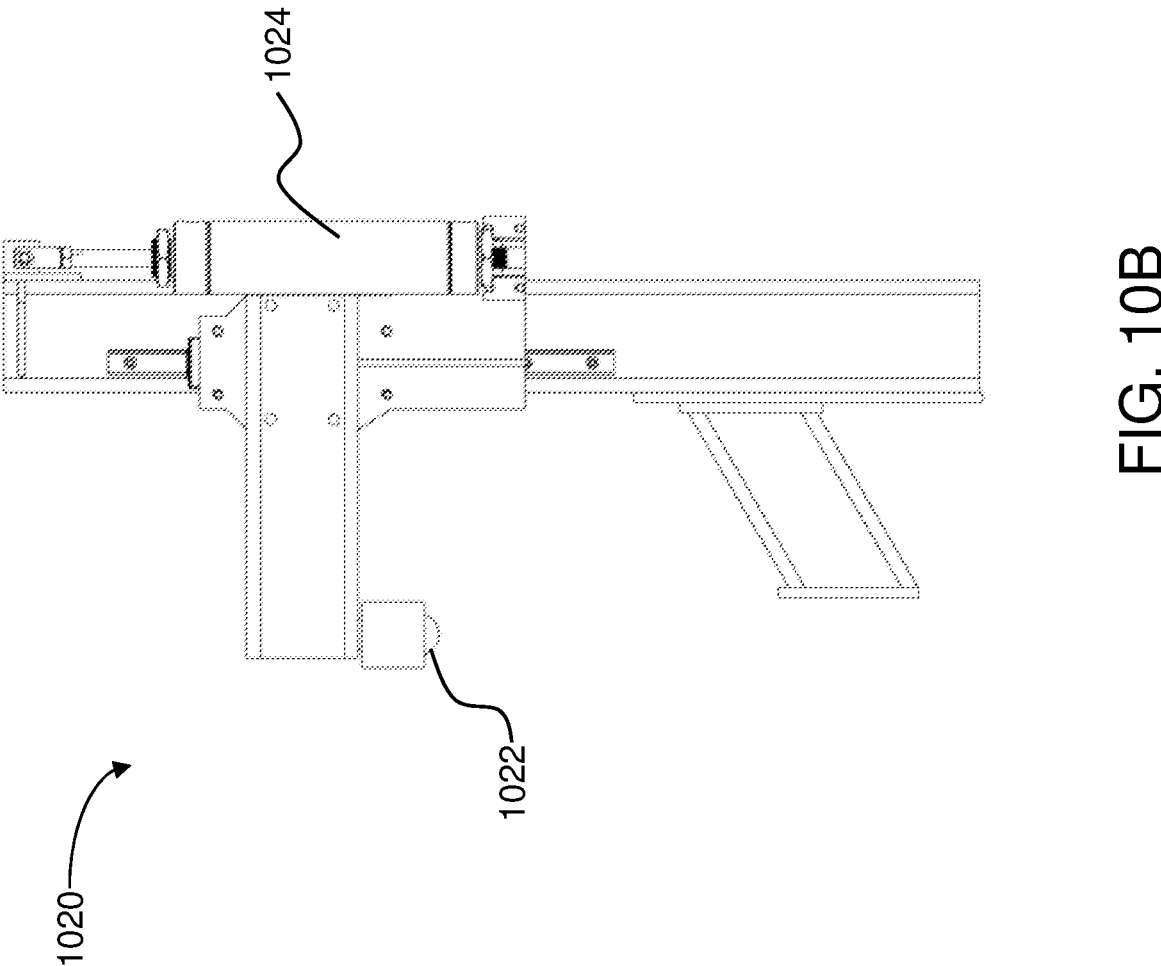
FIG. 10B is a side view of the hold-down unit of the fit-up system of FIG. 10A.

As still another example, while certain approaches to controlling positions of tubular sections have been described, other approaches to positional control of tubular sections are additionally or alternatively possible. For example, referring now to FIGS. 10A and 10B, a fit-up system 1000 may include a hold-down unit 1020, which may be particularly useful in instances in which the tubular section 202 is lightweight such that the force of gravity alone is insufficient to retain the tubular section 202 in place on tube rollers as a fit-up process is implemented. It should be understood that the fit-up system 1000 is analogous to or interchangeable with the fit-up system 100, unless otherwise indicated or made clear from the context. Thus, for the sake of clear and efficient description, the fit-up system 1000 is described with respect to the hold-down unit 1020 and other aspects of the fit-up system 1000 having an analog in the fit-up system 100 are not described separately.

In general, at least a portion of the hold-down unit 1020 may include a hold-down roller 1022 and an actuator 1024 in mechanical communication with the hold-down roller 1022. The hold-down roller 1022 may be any one or more of a ball transfer or a cylindrical (flat or crowned) roller such that the hold-down roller 1022 may roll along the inner surface of the tubular section 202 as the tubular section 202 rotates in the rotation direction 1009. In general, the actuator 1024 may impart linear motion to the hold-down roller 1022. For example, the actuator 1024 may include any one or more of the pneumatic cylinder, a hydraulic cylinder, an electric cylinder, an electric motor and screw, etc.

The actuator 1024 may be in electrical communication with a controller (e.g., the controller 108 in FIG. 1). In use, the actuator 1024 may maintain the hold-down roller 1022 in contact with the tubular section 202 at a position between two sets of tube rollers (e.g., between the first set 308 of tube rollers 102 and the second set 310 of tube rollers 102 in FIG. 3A). That is, more specifically, the actuator 1024 may maintain the position of the hold-down roller 1022 in contact with an inner surface of the tubular section 202 while an outer surface of the tubular section 202 is in contact with a first set of tube rollers and a second set of tube rollers. The resulting force exerted by the hold-down roller 1022 on the inner surface of the tubular section 202 may have a component opposite and substantially equal to the collective force exerted on the tubular section 202 by the fitting unit as part of any one or more of the fit-up techniques described herein. Through exertion of such force relative to the force exerted by the fitting unit, the hold-down unit 1020 may facilitate controlling inadvertent movement of the tubular section 202 in a direction having a radial component. Further, or instead, the hold-down unit 1020 may facilitate controlling the shape of the tubular section 202 between the two sets of tube rollers.

While pairs of tube rollers have been described as supporting a tubular section 202, other implementations are additionally or alternatively possible. For example, a single instance of a tube roller (e.g., the tube roller 102) may be actuated instead of a set of tube rollers. As compared to actuating the angle of a set of tube rollers, in instances in which a single roller is used, the position of the single roller, relative to the tubular section, may be actuated. In certain implementations, such actuation of a single roller may be used in combination with actuation of one or more sets of tube rollers to facilitate achieving a high degree of control over the shape of the tubular section.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention, which is to be interpreted in the broadest sense allowable by law.

What is claimed is:

1. A method of fitting a flange to a tubular section, the method comprising:
   rotating the tubular section toward a joining unit;
   rotating at least one portion of the flange toward the joining unit;

receiving one or more signals indicative of a radial offset between the tubular section and the at least one portion of the flange;

comparing the one or more signals indicative of the radial offset to a target value; and based at least in part on the comparison of the one or more signals to the target value, adjusting the radial offset between the at least one portion of the flange and the tubular section as the tubular section and the at least one portion of the flange each rotate toward the joining unit, wherein the one or more signals indicative of the radial offset include a radius of curvature of the tubular section between two tube rollers.

2. The method of claim 1, wherein rotation of the tubular section and rotation of the at least one portion of the flange are each about an axis perpendicular to a direction of gravity.

3. The method of claim 1, wherein, in a radial direction, the at least one portion of the flange is more rigid than the tubular section.

4. The method of claim 1, wherein rotating the tubular section includes driving at least one roller in contact with an outer surface of the tubular section.

5. The method of claim 1, wherein rotating the at least one portion of the flange toward the joining unit includes engaging first surface of the at least one portion of the flange with a pusher roller, and engaging a second surface of the at least one portion of the flange with a locating roller such that the at least one portion of the flange is pinched between the locating roller and the pusher roller.

6. The method of claim 1, wherein the one or more signals indicative of the radial offset are received from one or more sensors as the tubular section and the at least one portion of the flange move toward the joining unit.

7. The method of claim 1, wherein the one or more signals indicative of the radial offset include a radial distance between a location on the tubular section and a corresponding circumferential location on the flange.

8. The method of claim 1, wherein the one or more signals indicative of the radial offset include a user input.

9. The method of claim 1, wherein the at least one portion of the flange is a unitary hoop, and the target value of the radial offset is based on a first circumference of the unitary hoop relative to a second circumference of the tubular section.

10. The method of claim 1, wherein the target value varies as the at least one portion of the flange and the tubular section rotate toward the joining unit.

11. A method of fitting a flange to a tubular section, the method comprising:

rotating the tubular section toward a joining unit;

rotating at least one portion of the flange toward the joining unit;

receiving one or more signals indicative of a radial offset between the tubular section and the at least one portion of the flange;

comparing the one or more signals indicative of the radial offset to a target value; and based at least in part on the comparison of the one or more signals to the target value, adjusting the radial offset between the at least one portion of the flange and the tubular section as the tubular section and the at least one portion of the flange each rotate toward the joining unit wherein the target value varies as the at least one portion of the flange and the tubular section rotate toward the joining unit, and adjusting the radial offset includes receiving an indication of circumferential spacing between a first tick mark on the tubular section and a second tick mark on the at least one portion of the flange, and adjusting the target value for the radial offset based on the indication of circumferential spacing of the first tick mark relative to the second tick mark.

12. The method of claim 1, further comprising adjusting an axial gap between the tubular section and the at least one portion of the flange.

13. The method of claim 12, wherein adjusting the axial gap between the tubular section and the at least one portion of the flange includes moving the at least one portion of the flange in an axial direction as the tubular section remains fixed in the axial direction.

14. The method of claim 1, further comprising joining the at least one portion of the flange to the tubular section as the tubular section and the at least one portion of the flange rotate toward the joining unit.

15. The method of claim 11, wherein rotation of the tubular section and rotation of the at least one portion of the flange are each about an axis perpendicular to a direction of gravity.

16. The method of claim 11, wherein, in a radial direction, the at least one portion of the flange is more rigid than the tubular section.

17. The method of claim 11, wherein rotating the tubular section includes driving at least one roller in contact with an outer surface of the tubular section.

18. The method of claim 11, wherein rotating the at least one portion of the flange toward the joining unit includes engaging first surface of the at least one portion of the flange with a pusher roller, and engaging a second surface of the at least one portion of the flange with a locating roller such that the at least one portion of the flange is pinched between the locating roller and the pusher roller.

19. The method of claim 11, wherein the one or more signals indicative of the radial offset are received from one or more sensors as the tubular section and the at least one portion of the flange move toward the joining unit.

20. The method of claim 11, wherein the one or more signals indicative of the radial offset include a user input.

* * * * *